(12) United States Patent
Hollas et al.

(10) Patent No.: US 7,698,188 B2
(45) Date of Patent: Apr. 13, 2010

(54) ELECTRONIC ENTERPRISE CAPITAL MARKETPLACE AND MONITORING APPARATUS AND METHOD

(75) Inventors: Judd E. Hollas, Fayetteville, AR (US); Ronald R. Goforth, Fayetteville, AR (US)

(73) Assignee: Beta-Rubicon Technologies, LLC, Fayetteville, AR (US)

( * ) Notice: Subject to any disclaimer, the term of this patent is extended or adjusted under 35 U.S.C. 154(b) by 878 days.

(21) Appl. No.: 11/266,572

(22) Filed: Nov. 3, 2005

(65) Prior Publication Data

US 2007/0100724 A1  May 3, 2007

(51) Int. Cl.
G06Q 40/00 (2006.01)
(52) U.S. Cl. ....................................................... 705/35
(58) Field of Classification Search ............... 705/35–40
See application file for complete search history.

(56) References Cited

U.S. PATENT DOCUMENTS

| | | | |
|---|---|---|---|
| 5,784,696 A | 7/1998 | Melnikoff | |
| 5,806,049 A | 9/1998 | Petruzzi | |
| 6,154,731 A | 11/2000 | Monks et al. | |
| 2002/0087446 A1* | 7/2002 | Reddy | ........................ 705/36 |
| 2002/0087450 A1 | 7/2002 | Reddy | |
| 2002/0087506 A1 | 7/2002 | Reddy | |
| 2002/0138385 A1 | 9/2002 | Milam | |
| 2003/0028455 A1* | 2/2003 | Yamaguchi et al. | ........... 705/35 |
| 2003/0069822 A1 | 4/2003 | Ito et al. | |
| 2003/0101115 A1 | 5/2003 | Reddy | |
| 2004/0024674 A1 | 2/2004 | Feldman | |
| 2004/0044505 A1 | 3/2004 | Horwitz | |
| 2004/0128174 A1* | 7/2004 | Feldman | ........................ 705/7 |
| 2004/0199445 A1 | 10/2004 | Eder | |
| 2005/0144106 A1 | 6/2005 | Eder | |

OTHER PUBLICATIONS

International Search Report and Written Opinion for PCT/US06/41815.
Materials concerning OffRoad Capital Markets, available at http://www.offroadcapital.com, May 19, 2005.

* cited by examiner

Primary Examiner—Olabode Akintola
(74) Attorney, Agent, or Firm—J. Charles Dougherty

(57) ABSTRACT

An automated and interactive system that facilitates efficient capitalization/liquidation and monitoring of private and publicly-traded enterprises through a network-driven marketplace is disclosed. The system may be comprised of a dynamic process for enterprise characterization, a customizable computational engine that utilizes statistical reference information to quantify a multi-factor scoring value for each unique enterprise, a customizable system for investor-users to filter, rank, and screen enterprise prospects, a customizable system for monitoring the performance of enterprises, an integrated internal system for electronic communication between market participants, and an empirical feedback system that provides a dynamic knowledge base of statistical reference information for various computational components of the invention.

59 Claims, 17 Drawing Sheets

1. Direct manipulation of Probability Density Functions (PDF's) represented by histograms 2. Direct manipulation of Probability Density Functions (PDF's) represented by histograms

ELECTRONIC ENTERPRISE CAPITAL MARKETPLACE AND MONITORING APPARATUS AND METHOD

BACKGROUND OF THE INVENTION

The present invention relates to a method and system for the formation of an electronic network-based capital marketplace that facilitates efficient capitalization and liquidation of enterprises by market participants through utilization of enterprise search-and-sort and associated decision support systems. The present invention also relates to an integrated method and system for efficient electronic monitoring of enterprise performance.

Through its enabling role in the capitalization of new and emerging enterprises, the market for private equity and debt capital constitutes an essential pillar of modern capitalism. A lack of integrated process automation and considerable market fragmentation, however, constrain investors' ability to collectively create an efficient market for private capital. A leading study from Harvard University found that "efficient markets do not exist for allocating risk capital to early-stage technology ventures and that serious inadequacies exist in information available to both entrepreneurs and investors." The prevalence of such inefficiencies in a significant capital market like private equity imposes limitations on investors and entrepreneurs alike, but most importantly, these inefficiencies fundamentally limit the efficient, free-market premise of modern capitalism.

Current investor "deal-flow" (i.e., enterprise identification and screening) practices rely largely on fragmented networks of non-stakeholders for prospect identification, and subsequently on manually intensive screening processes for initial qualification of these enterprise prospects (in lieu of the due diligence process). Considerable inherent market fragmentation inhibits efficient matching of enterprise agent and investor agent groups, and manual screening processes employed by investor agents limit their potential rate of enterprise exposure. In addition, these referral networks restrict the velocity of information flow, and hence inhibit the ultimate rate at which capitalization and liquidation decisions are made. For entrepreneurs, poor availability and high costs of capital associated with current practices can restrict their ability to survive and grow. The substantial time and attention demands of current practices distract entrepreneurs from their critical operational responsibilities. For other enterprise agents seeking an enterprise liquidity event, conventional market practices are in aggregate, ineffective at producing adequate marketplace liquidity.

Once capitalized, the performance of young enterprises is typically monitored by investors to minimize the probability of failure and maximize the investors' return on capital. However, one-third of young enterprises typical fail within three years of capitalization, indicating that investors have in general not implemented an effective systematic method for adequately monitoring the performance of their portfolio enterprises. Studies have determined that around 50% of business failures could have been avoided if related indications of incipient failure had been detected early enough, thereby identifying the need for a systematic method of enterprise performance monitoring and emerging failure detection.

Since the Internet presents an effective communication platform for the sharing of information such as enterprise business plans with potential investor agents, several online entities have established rudimentary network-based platforms for enterprise agents to submit and share their business plans with member investor agents. None of these intermediates, however, have systematically employed process automation that advances and improves the process beyond conventional practices. The only distinguishing feature of these processes beyond conventional investor deal-flow practices is that they have utilized the Internet as a central location for communication between both parties. Since they have failed to introduce procedures and technologies that engender a more efficient process, the industry has been incapable of facilitating an efficient marketplace for private capital.

The risk (i.e., probabilistic uncertainty) associated with the expected fiscal performance of an enterprise asset is comprised of both systematic (economy-based and market-based) risk and unsystematic (firm-based and industry-based) risk. These risk categories are functions of various endogenous (e.g., cash flow management) and exogenous (e.g., interest rates) factors inherent to the enterprise. Enterprises in specific industry sectors exhibit sufficiently similar risk profiles such that specific risk factors are largely consistent in these near-homogenous cross-sections of the enterprise domain. Empirically, studies have determined that certain identifiable enterprise attributes of endogenous and exogenous form exhibit a statistically significant correlation with enterprise risk and can be used as a knowledge reference to compute and predict the risk inherent to a specific enterprise.

Over the years, academic researchers have developed numerous techniques for enterprise failure prediction, including: classical cross-section statistical methods, machine learning decisions trees, neural networks, fuzzy rules-based classification model, multi-logic model, cumulative sum model, dynamic event history analysis, catastrophe theory and chaos theory model, multidimensional scaling, linear goal programming, multi-criteria decision aid approach, rough set analysis, expert systems, and self-organizing maps. Of all these methods, the majority of peer review studies find that conventional multivariate statistical techniques and neural network techniques generally perform best. However, several investigations have found that the performance of neural network techniques is subject to "over-fitting" that may result in an overstated accuracy for the neural network in comparison to the other techniques.

Some techniques for valuing an enterprise have been described in a number of patent applications, including the disclosures of U.S. Pat. Application Publication Nos. 2002/0174081 to Charbonneau et al. and 2004/0024674 and 2004/0128174 to Feldman. While these techniques are asserted to be applicable to private enterprises, they are devoid of any technique for validation and reconciliation of the input consisting of enterprise attributes, which often can be erroneous due to subjective and biased sources of origination (i.e., entrepreneurs seeking capital). It is well accepted within the relevant arts that the current value of an asset is a function of the asset's expected generation of future free cash flows, each of which is discounted at a rate of risk (i.e., cost of capital). Neither valuation technique is capable of augmenting projected perpetual free cash flows by the statistically computed unique endogenous and exogenous risk profile of an enterprise to compute the risk-adjusted valuation of an enterprise. Specifically, the disclosure of U.S. Patent Application Publication No. 2002/0174081 requires comparable metrics of current enterprises in order to train its neural network and determine a current enterprise valuation, a method which is highly sensitive to market deviations from efficient asset pricing as experienced in the excessive speculation in the late 1990s.

Some techniques for quantifying the risk of an enterprise have been described in a number of patent applications, including the disclosures of U.S. Patent Application Publication Nos. 2004/0044617 to Lu, 2004/0044505 to Horwitz, and 2002/0147676 to Karmali. In general, these techniques restrict their consideration of enterprise risk to a finite group a factors that constitute symptomatic indications of enterprise risk. Their inadequacy results from an inability to incorporate a dynamic collection of endogenous and exogenous parameters that represent root causes of enterprise risk. Specifically, U.S. Patent Application Publication Nos. 2004/0044617 and 2002/0147676 do not fully automate or disclose their process of risk quantification and require the user to input subjective parameters that serve as reference values in the quantification of risk. Their primary relative inadequacy lies in their lack of a systematic method for dynamically incorporating new and evolving statistical reference information that correlates endogenous and exogenous enterprise-related attributes with dependent parameters representing enterprise risk.

Some techniques for matching entrepreneurs and investors have been described in a number of patents applications, including U.S. Patent Application Publication Nos. 2002/0138385 to Milam and 2002/0087450, 2002/0087446, 2003/0101115, and 2002/0087506 to Reddy. A majority of the investors to which these techniques are targeted generally employ complex and intuitive rule-based methods in their screening and ranking of enterprise investment prospects. While the techniques embodied in the referenced prior art allow for rudimentary criteria-based matching of investors and entrepreneurs, they do not provide the systematic functionality necessary to conform automated methods to existing practices in such a way that engenders an efficient process, and hence do not provide an efficient market for private enterprise capitalization. For example, none of the prior art enables investors with high degrees of freedom in enterprise search criterion or the capability to rank enterprise matches through a system that is capable of incorporating specific investor preferences in a computation of a multi-factor enterprise scoring value.

Individually, techniques have been described for enterprise valuation, enterprise risk assessment, and Internet-based enterprise agent and investor agent matching. No prior art techniques have been described that provide an integrated system for aggregating enterprise risk and valuation analysis, enterprise agent and investor agent matching, and enterprise monitoring in a construct that is capable of creating an efficient marketplace. Such a system and method would be highly desirable by market participants and effective at improving productivity and liquidity within an industry that controls close to $1 trillion in capital and that is responsible for the original funding of one third of U.S. public companies.

SUMMARY OF THE INVENTION

It is an objective of the present invention to overcome drawbacks of the prior art by providing a method and system that facilitates efficient capitalization/liquidation and monitoring of private and publicly-traded enterprises. In various embodiments, the system is comprised of (i) a dynamic process for enterprise characterization, (ii) a highly customizable system for investor agents to filter, rank, and screen enterprise prospects, (iii) a computational engine that utilizes statistical reference correlations to quantify a multi-factor enterprise scoring value for each unique enterprise, (iv) a system for automated or interactive monitoring of the performance of enterprises, (v) an integrated internal system for electronic communication between market participants, (vi) a dynamic empirical feedback system that provides a knowledge base of statistical reference information for various computational components of the invention.

According to the various embodiments of the present invention, enterprise agents have the capability to submit information that characterizes their enterprise and investor agents have the capability to utilize customizable search-and-sort technology to screen large volumes of enterprises and efficiently identify a finite number of enterprises for further due diligence and potential investment. The core enterprise analysis engine of this invention is capable of automatically quantifying a multi-factor enterprise scoring value for enterprises. The software of the present invention is coupled with robust database search capabilities to produce an e-marketplace solution that allows investor agents to efficiently screen and rank potentially thousands of enterprises based on specific user-defined deal-flow preferences (e.g., enterprise type, CEO education, IP status, etc). This unique combination of automated techniques facilitates the creation of an efficient marketplace for intelligently matching enterprise agents who seek capital or a liquidity event with investor agents who seek investment opportunities.

The invention overcomes limitations of the prior art by providing a unique integration of novel automated systems that collectively provide the functionality necessary for creation of an efficient marketplace for enterprise capitalization/liquidation and monitoring. The invention provides a secure, independent, and accessible platform that utilizes search-and-sort technology to efficiently and intelligently match enterprise agents and investor agents. It dramatically reduces recognized industry deficiencies by combining automated decision support systems and a comprehensive suite of services in the form of an e-marketplace that offers a single destination for enterprise agents to find capital or a liquidity event and for investor agents to screen enterprise prospects, obtain independent due diligence, and monitor the progress of enterprises.

The invention enables investor agents to efficiently track and benchmark the ongoing performance of multiple enterprises via the use of an automated and interactive enterprise monitoring system. Enterprise agents can conveniently access the web-based monitoring system to periodically report enterprise performance for review by relevant investor agent(s). Investor agents can set benchmarks and thresholds that generate automatic investor agent notification if intersected, statistically predict future enterprise performance and probability of failure, or use robust interactive analysis tools to intelligently monitor enterprise progress.

These and other features, objects, and advantages of the present invention will become better understood from a consideration of the following detailed description of the preferred and alternative embodiments and appended claims in conjunction with the drawings as described following:

DRAWINGS

DETAILED DESCRIPTION OF THE PREFERRED EMBODIMENTS

Figure 1:
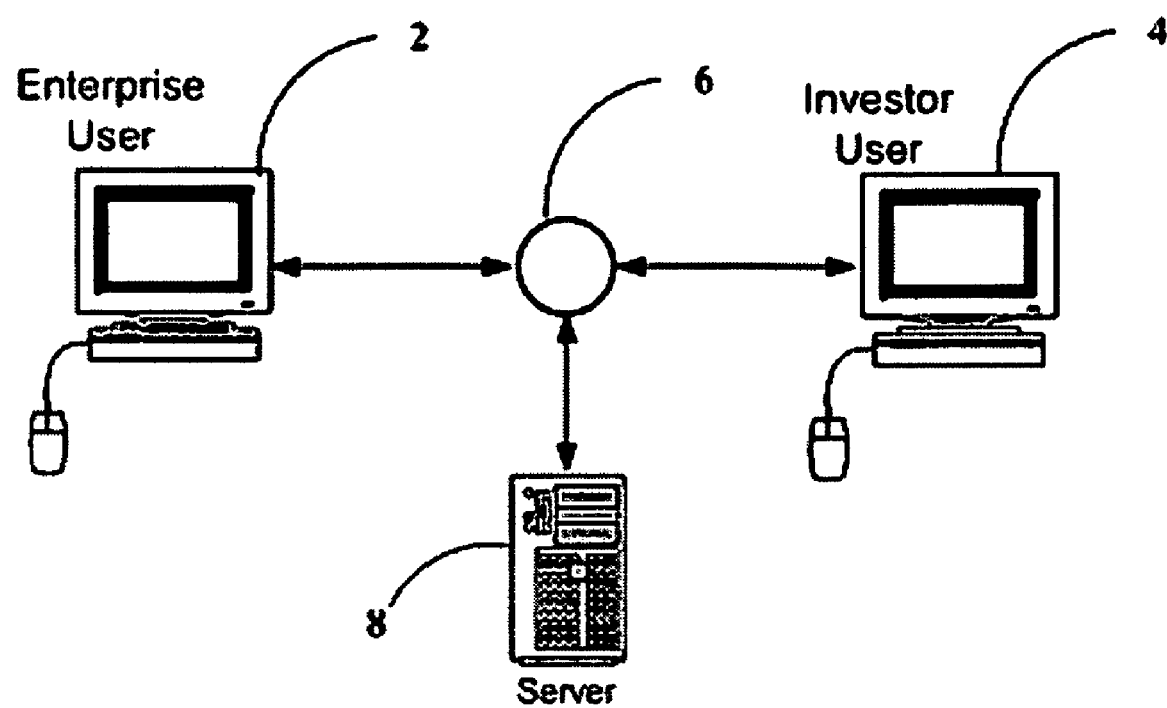
FIG. 1 is a schematic diagram of hardware components used in a preferred embodiment of the present invention.

With reference to FIG. 1, the hardware and network components used in the implementation of a preferred embodiment of the present invention may now be described. The present invention is intended to be used by enterprise agents who are seeking investment monies or liquidity event, as well as investor agents who are seeking to find enterprises in which to invest. For purposes herein, an "enterprise-user" will be any stakeholder, representative, or agent who interacts with the system on his/her own behalf or on behalf of the stakeholders of a particular enterprise or enterprises. Likewise, an "investor-user" will be any investor, representative, or agent who interacts with the system on his/her own behalf or on behalf of a particular investor or investors or potential investor or investors. In the preferred embodiment, each enterprise-user and investor-user is assumed to access the system from an enterprise-user terminal 2 and investor-user terminal 4, respectively. Although only one each of these terminals are shown in FIG. 1, the preferred embodiment would allow a number of enterprise-users and investor-users to access the system by means of different terminals 2 and 4, respectively, maintained by each such party. Terminals 2 and 4 are preferably personal computers, but may also be any other device capable of sending and receiving textual and graphical information over a network. Both terminals 2 and 4 are linked to network 6, which in the preferred embodiment is the Internet.

The various functionality of the preferred embodiment is implemented primarily by means of software that is run from server 8. Server 8 is connected by means of network 6 to each enterprise-user terminal 2 and investor-user terminal 4. In the preferred embodiment, the application software running at server 8 is provided by an independent party as an application service provider (ASP). Using this model, all proprietary software resides at server 8, and the only software required to use the system at enterprise-user terminals 2 and investor-user terminals 4 is the software needed to access network 6, which for the Internet may be an Internet browser. In an alternative embodiment, the software may include a proprietary access component that must be installed at terminals 2 and 4 in order to access the system. Such component may be, for example, a browser plug-in or a stand-alone software application.

Server 8 is preferably maintained by an independent party, who is responsible for hosting all of the application software and maintaining all of the databases associated with the preferred embodiment. As will be explained below, certain data may be kept secret from enterprise-users or investor-users, and thus server 8 is preferably maintained by a disinterested independent party whose compensation is not directly derived from the funding or valuation of any investments resulting from use of the system. This system would thus provide no incentive for the independent party maintaining server 8 to provide any advantage to another user of the system by revealing any of the confidential information maintained on the system.

Figure 2:
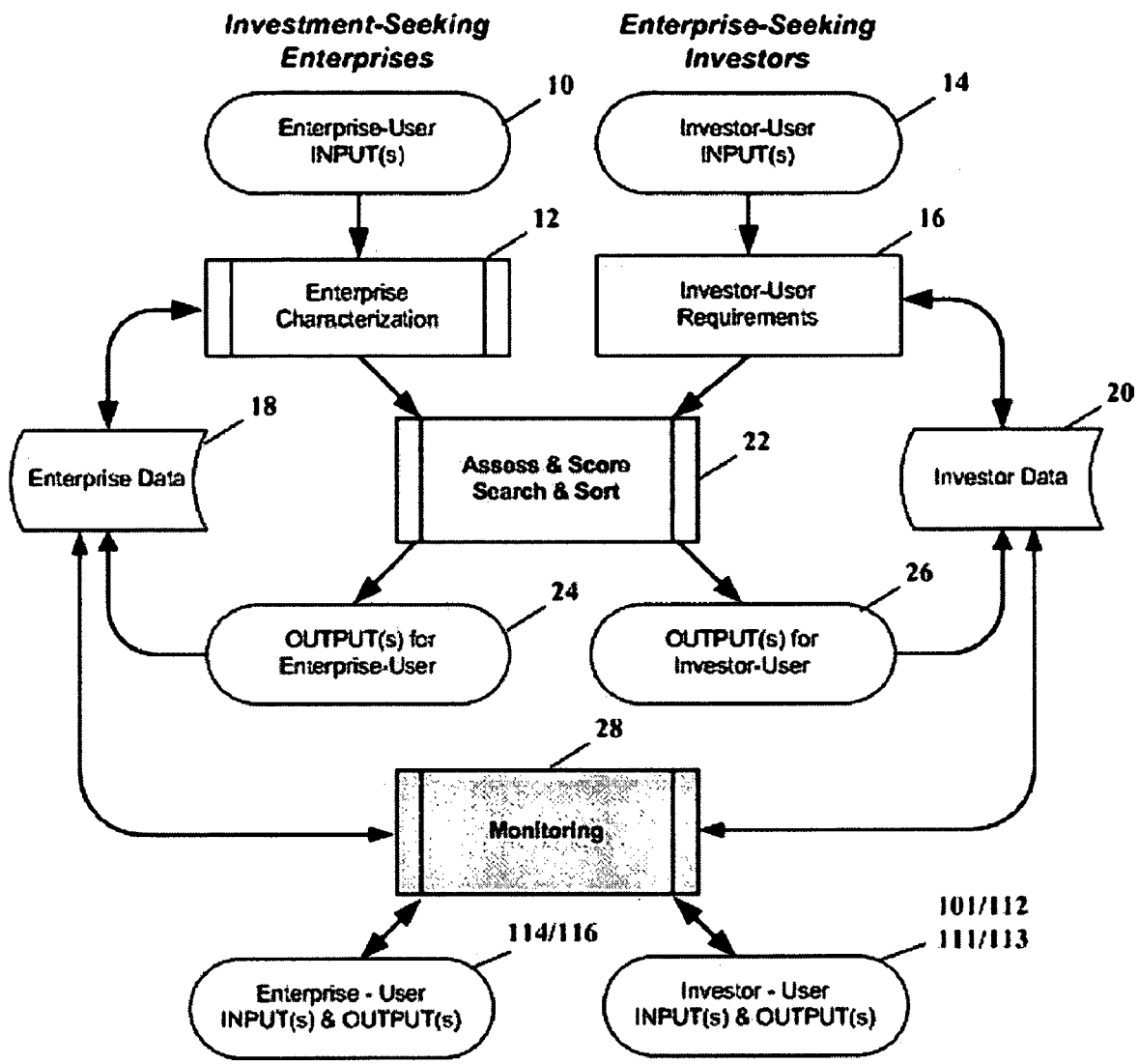
FIG. 2 is a diagram depicting logical elements of a preferred embodiment of the present invention.

With reference now to FIG. 2, the functionality of the software of the preferred embodiment of the present invention may be described in overview. Enterprise-user input block 10 represents various forms of characterizing information related to the enterprise. Such information would be entered through an enterprise-user terminal 2 as depicted in FIG. 1. That information may be of a general nature, or in the preferred embodiment may be more detailed information that is processed at enterprise characterization block 12, as described more fully below. It should be noted that, except for those instances when the information inherent to a unique input or output block is explicitly described, all input and output blocks shown in the figures described herein are intended to represent and contain the information provided or received, respectively, by users that is described for relevant attached blocks in related figures.

In the preferred embodiment, information received at block 12 is elicited through user prompts generated through the system from server 8 by a graphical user interface appearing at enterprise-user terminal 2. Subsequent prompts are preferably customized based upon the characterizing information already entered by the enterprise-user. A preferred set of prompts and allowable responses is provided in the following table. The first column of this table provides a unique query ID associated with each query, where an ID with a non-zero value in the tenths position is a sub-query under the matching ID with the same digit in the ones position and a zero in the tenths position; for example, A2.1 is a sub-query under query A2.0. The second column identifies any dependencies associated with the query, that is, whether a particular answer to another query is required in order for the query to be presented. For example, for A2.0 the entry "A1.0=Y" means that query A2.0 is only asked if the answer to query A1.0 is "yes." The third column identifies the nature of the query. The fourth column identifies the preferred type of input expected and allowed. The following designations and abbreviations are used in the fourth column:
- Y/N="yes" or "no"
- Text=any alphanumeric characters
- MC=multiple choice
- MCC=multiple choice cumulative (i.e., more than one choice is allowed)
- SNV=single numeric value
- Radio=radio selection button

| | | INPUT CATEGORY A: PRODUCT/SERVICE CHARACTERIZATION | |
|---|---|---|---|
| A1.0 | | Does enterprise currently have a commercially available product(s) or service(s)? | Y/N |
| A2.0 | A1.0 = Y | Provide a general characterization of each commercially available product and service: | |
| A2.1 | | Name | Text |
| A2.2 | | Description of key performance attributes | Text |
| A2.3 | | Advantages relative to average competing products | Text |
| A2.4 | | Disadvantages relative to average competing products | Text; MC |
| A2.5 | | Number of current customer implementations | SNV |
| A2.6 | | Current market share | SNV |
| A2.7 | | Barriers to competitive emulation | Text; MC |
| A2.8 | | Does production utilize existing production technologies? | Y/N |
| A3.0 | A1.0 = Y | Provide a technical characterization of each commercially available product and service: | |
| A3.1 | | Name | MC |
| A3.2 | | Is supporting technical data available? | Y/N |
| A3.3 | A3.2 = Y | Data type | MC |
| A3.4 | A3.2 = Y | Data source | MC |
| A3.5 | | Have technical aspects been documented? | Y/N |
| A4.0 | | Does enterprise currently have a product(s) or service(s) in development? | Y/N |
| A5.0 | A4.0 = Y | Characterize each product and service currently in development: | |
| A5.1 | | Name | Text |
| A5.2 | | Key performance attributes | Text |
| A5.3 | | Performance advantages | Text; MC |
| A5.4 | | Performance disadvantages | Text; MC |
| A5.5 | | Projected time to fully functional prototype? | SNV |
| A5.6 | | Projected time to fully functional commercial product? | SNV |
| A5.7 | | Will the production of this product utilize existing production technologies (commercially proven and available)? | Y/N |
| A6.0 | | Provide a technical characterization of each product currently in development: | |
| A6.1 | | Are functional specs available? | Y/N |
| A6.2 | | List possible barriers to advancement | Text |
| | | INPUT CATEGORY B: INTELLECTUAL PROPERTY (IP) | |
| B1.0 | | Does enterprise currently have any applied for or granted IP relating to product(s)? | Y/N |
| B2.0 | B1.0 = Y | Choose which of the following IP has been applied for or granted and the number of grants per type: | |
| B2.1 | | US patents - applied | SNV |
| B2.2 | | US patents - granted | SNV |
| B2.3 | | International patents - applied | SNV |
| B2.4 | | International patents - granted | SNV |
| B2.5 | | Trademarks - applied | SNV |
| B2.6 | | Trademarks - granted | SNV |
| B2.7 | | Copyrights - applied | SNV |
| B2.8 | | Copyrights - granted | SNV |
| B3.0 | B2.1 > 0<br>B2.2 > 0<br>B2.3 > 0<br>B2.4 > 0 | Characterize each applied and granted patent in terms of the following attributes: | |
| B3.1 | | US status | MC |
| B3.2 | B3.1 | US life remaining | SNV |
| B3.3 | | International status | MC |
| B3.4 | B3.3 | International life remaining | SNV |
| B3.5 | | Inventor(s) | Text |
| B3.6 | | Product relation | MC |
| B3.7 | | Summary of abstract | Text |
| B4.0 | | Do any products rely on any ancillary intellectual property? | Y/N |
| B5.0 | B4.0 = Y | Provide the following information for each product that relies on any ancillary intellectual property: | |
| B5.1 | | Product dependent on any ancillary IP? | Y/N |

| | | | |
|---|---|---|---|
| B5.2 | | Has contractual agreement(s) been established with all ancillary IP owner(s)? | Y/N |
| B5.3 | | Average term of exclusive right(s) to use | SNV |
| B5.4 | | Average term of non-exclusive right(s) to use | SNV |
| B5.5 | | How many ancillary patents will require usage rights in order to commercialize product? | SNV |
| B5.6 | | How many ancillary copyrights will require usage rights in order to commercialize product? | SNV |
| B6.0 | | How do you intend to protect your IP in the future? | MC |
| INPUT CATEGORY C: BUSINESS CHARACTERIZATION | | | |
| C1.0 | | Provide a brief description (less than 100 words) of the enterprise (this summary will be listed w/ company name in investor-user search results) | Text |
| C2.0 | | Provide a comprehensive list of keywords that identify the nature of your product(s)/service(s), enterprise, and market(s). (These keywords will enable investor-users to identify your enterprise when searching via specific interests.) | Text |
| C3.0 | | How many years has enterprise been in existence (to the tenths)? | SNV |
| C4.0 | | Characterize the current status of enterprise's historic documentation and formal planning: | |
| C4.1 | | Historic financial records - complete | Radio |
| C4.2 | | Historic financial records - incomplete | Radio |
| C4.3 | | Historic financial records - not attempted | Radio |
| C4.4 | | Historic financial records - available for review? | Y/N |
| C4.5 | | Business plan - complete | Radio |
| C4.6 | | Business plan - incomplete | Radio |
| C4.7 | | Business plan - not attempted | Radio |
| C4.8 | | Business plan - available for review? | Y/N |
| C4.9 | | Financial projections - complete | Radio |
| C4.10 | | Financial projections - incomplete | Radio |
| C4.11 | | Financial projections - not attempted | Radio |
| C4.12 | | Financial projections - available for review? | Y/N |
| C4.13 | | Market assessment - complete | Radio |
| C4.14 | | Market assessment - incomplete | Radio |
| C4.15 | | Market assessment - not attempted | Radio |
| C4.16 | | Market assessment - available for review? | Y/N |
| C4.17 | | Competitive assessment - complete | Radio |
| C4.18 | | Competitive assessment - incomplete | Radio |
| C4.19 | | Competitive assessment - not attempted | Radio |
| C4.20 | | Competitive assessment - available for review? | Y/N |
| C5.0 | | Describe the enterprise's business model in the following terms: | |
| C5.1 | | Structural model | Text |
| C5.2 | | Revenue model | Text |
| C6.0 | | Describe how/why the company's specific business model is optimal for the nature of its product, target market(s), and competition: | Text |
| C7.0 | | Describe the company's market penetration and competitive protection strategies: | |
| C7.1 | | Market penetration strategy | Text |
| C7.2 | | Competitive protection strategy | Text |
| C8.0 | | Does the enterprise have an established distribution strategy? | Y/N |
| C9.0 | C8.0 = Y | How will the majority of products/services be distributed in terms of channel and delivery type: | |
| C9.1 | | Channel type | MC |
| C9.2 | | Delivery type | MC |
| C10.0 | | Does the enterprise have any established supply-chain relationships w/ outside entities (supplier or buyer)? | Y/N |
| C11.0 | C10.0 = Y | Quantify all established supply-chain relationships in terms of the following criteria: | |
| C11.1 | | Number of contracted supplier relationships | SNV |
| C11.2 | | Number of un-contracted supplier relationships | SNV |
| C11.3 | | Number of contracted buyer relationships | SNV |
| C11.4 | | Number of un-contracted buyer relationships | SNV |
| C12.0 | C10.0 = Y | Describe each supply-chain partnership: | |
| C12.1 | | Name of distribution partner | Text |
| C12.2 | | Nature of partnership | MC |
| C13.0 | | Does the enterprise have any established strategic relationships (excluding distribution)? | Y/N |
| C14.0 | C13.0 = Y | Quantify all established strategic relationships in terms of the following criteria: | |
| C14.1 | | Number of contracted strategic relationships | SNV |
| C14.2 | | Number of un-contracted strategic relationships | SNV |
| C15.0 | C13.0 = Y | Describe each strategic partnership: | |

-continued

| | | | |
|---|---|---|---|
| C15.1 | | Name of strategic partner | Text |
| C15.2 | | Nature of partnership | MC |
| C16.0 | A1.0 = Y | Provide the top 1-5 customers and their revenue contribution in each historical fiscal year (FY): | |
| C16.1 | | Each customer name in each historical FY | Text |
| C16.2 | | Portion of total revenue for each customer in each historical FY | SNV |
| C17.0 | | Provide an employee headcount by each function for each historical FY: | |
| C17.1 | | function | MC |
| C17.2 | C17.1 | Headcount by each function in each historical FY | SNV |
| C18.0 | | Provide the projected employee headcount by function for each future FY: | |
| C18.1 | | Function | MC |
| C18.2 | C18.1 | Headcount by function in each future FY | SNV |
| C19.0 | | Has the enterprise employed the use of any professional advisors? | Y/N |
| C19.1 | C19.0 = Y | How many hours of professional advice have been utilized? | SNV |
| C20.0 | | Does the enterprise have a functioning board of directors? | Y/N |
| C20.1 | C20.0 = Y | How many board members? | SNV |
| C21.0 | | Is the enterprise or any of its principals involved in any pending or threatening legal action(s) or related proceeding(s)? | Y/N |
| C21.1 | C21.0 = Y | Describe the threatening legal action(s) or related proceeding(s) | Text |
| C22.0 | | Does the company have any unsatisfied liens or judgments against the company, any of its principals, or subsidiary(ies)? | Y/N |
| C22.1 | C22.0 = Y | Describe the unsatisfied liens or judgments against the company, any of its principals, or subsidiary(ies)? | Text |
| | | INPUT CATEGORY D: MARKET CHARACTERIZATION | |
| D1.0 | | Provide a characterization of each current target market segment for each company product and service in terms of the following criteria: | |
| D1.1 | | Market name | Text |
| D1.2 | | Description of target customer base | Text |
| D1.3 | | Target market industry type | MC |
| D1.4 | | Current number of customers | SNV |
| D1.5 | | Current market share | SNV |
| D1.6 | | Current total market size (in dollars) for each market | SNV |
| D1.7 | | Projected 5-yr compounded annual growth rate for each market | SNV |
| D1.8 | | Source of information for 5-yr projection | MC |
| D1.9 | | Potential drivers of market growth and demand for product/service | MCC |
| D1.10 | | Potential barriers to market adoption | MCC |
| D1.11 | | Other potential general market risks | Text |
| D1.12 | | Describe the basis for why you feel target market(s) will adopt your various products, including the assumptions that underlie this basis. | Text |
| D2.0 | | Provide a characterization of each long-term extensible market segment of each product and service in terms of the following criteria: | |
| D2.1 | | Market name | Text |
| D2.2 | | Description of target customer base | Text |
| D2.3 | | Target market industry type | MC |
| D2.4 | | Time to market introduction | MC |
| D2.5 | | Current total market size (in dollars) for each market | SNV |
| D2.6 | | Projected 5-yr compounded annual growth rate for each market | SNV |
| D2.7 | | Source of information for 5-yr projection | MC |
| D2.8 | | Potential drivers of market growth and demand for product/service | MCC |
| D2.9 | | Potential barriers to market adoption | MCC |
| D2.10 | | Other potential general market risks | Text |
| D2.11 | | Describe the basis for why you feel target market(s) will adopt your various products, including the assumptions that underlie this basis | Text |
| D3.0 | | Describe the enterprise's general marketing strategy | Text |
| | | INPUT CATEGORY E: COMPETITION | |
| E1.0 | | Characterize each competitor in each market for which each company product and service competes in terms of the following criteria: | |

-continued

| | | |
|---|---|---|
| E1.1 | Market name | MC (D1.1, D2.1 "Market Name") |
| E1.2 | Competitor name | Text |
| E1.3 | Competitor product name | Text |
| E1.4 | Competitor penetration maturity | MC |
| E1.5 | Competitor current market share | SNV |
| E1.6 | Competitor advantages relative to enterprise product | Text; MC |
| E1.7 | Competitor disadvantages relative to enterprise product | Text; MC |
| E2.0 | Describe the enterprise's strategy for maintaining or improving its competitive position | Text |

INPUT CATEGORY F: FINANCIAL

| | | |
|---|---|---|
| F1.0 | Indicate how revenue and development costs are recognized: | |
| F1.1 | Revenue | MC |
| F1.2 | Development expenses | MC |
| F2.0 | Where available, provide the following annual financial metrics for each historical fiscal year (FY): | |
| F2.1 | Each product number of units sold in each historical FY | SNV |
| F2.2 | Each service number of customers in each historical FY | SNV |
| F2.3 | Each product revenue in each historical FY | SNV |
| F2.4 | Each service revenue in each historical FY | SNV |
| F2.5 | Other revenue in each historical FY | SNV |
| F2.6 | Total revenue in each historical FY | SNV |
| F2.7 | Direct cost of each product revenue in each historical FY | SNV |
| F2.8 | Direct cost of each service revenue in each historical FY | SNV |
| F2.9 | Direct cost of other revenue in each historical FY | SNV |
| F2.10 | Sales and marketing cost in each historical FY | SNV |
| F2.11 | General and administrative cost in each historical FY | SNV |
| F2.12 | Research and development cost in each historical FY | SNV |
| F2.13 | Depreciation and amortization cost in each historical FY | SNV |
| F2.14 | Total cost of operations in each historical FY | SNV |
| F2.15 | Other income in each historical FY | SNV |
| F2.16 | Interest expense in each historical FY | SNV |
| F2.17 | Income taxes in each historical FY | SNV |
| F2.18 | Cash flow from operations in each historical FY | SNV |
| F3.0 | Where available, provide the following year-end historical financial metrics for each historical fiscal year (FY): | |
| F3.1 | Cash and short-term investments in each historical FY | SNV |
| F3.2 | Accounts receivable in each historical FY | SNV |
| F3.3 | Other current assets in each historical FY | SNV |
| F3.4 | Capital assets in each historical FY | SNV |
| F3.5 | Accumulated depreciation and amortization in each historical FY | SNV |
| F3.6 | Accounts payable in each historical FY | SNV |
| F3.7 | Short-term debt in each historical FY | SNV |
| F3.8 | Long-term debt in each historical FY | SNV |
| F3.9 | Paid-in capital in each historical FY | SNV |
| F4.0 | Indicate how financial revenue and operational cost projections were established: | |
| F4.1 | Revenue | MC |
| F4.2 | Operational costs | MC |
| F5.0 | Where available, provide the following pro-forma projected operational and financial metrics for the current and each future fiscal year (FY): | |
| F5.1 | Each product number of units for the current and each future FY | SNV |
| F5.2 | Each service number of customers for the current and each future FY | SNV |
| F5.3 | Each product revenue for the current and each future FY | SNV |
| F5.4 | Each service revenue for the current and each future FY | SNV |
| F5.5 | Other revenue for the current and each future FY | SNV |
| F5.6 | Total revenue for the current and each future FY | SNV |
| F5.7 | Direct cost of each product revenue for the current and each future FY | SNV |

-continued

| | | | |
|---|---|---|---|
| F5.8 | | Direct cost of each service revenue for the current and each future FY | SNV |
| F5.9 | | Direct cost of other revenue for the current and each future FY | SNV |
| F5.10 | | Sales and marketing cost for the current and each future FY | SNV |
| F5.11 | | General and administrative cost for the current and each future FY | SNV |
| F5.12 | | Research and development cost for the current and each future FY | SNV |
| F5.13 | | Depreciation and amortization cost for the current and each future FY | SNV |
| F5.14 | | Total cost of operations for the current and each future FY | SNV |
| F5.15 | | Other income for the current and each future FY | SNV |
| F5.16 | | Interest expense for the current and each future FY | SNV |
| F5.17 | | Income taxes for the current and each future FY | SNV |
| F5.18 | | Cash flow from operations for the current and each future FY | SNV |
| F5.19 | | Capital expenditures for the current and each future FY | SNV |
| F5.20 | | Net change in working capital for the current and each future FY | SNV |
| F6.0 | | How will the enterprise perform accounting and financial control functions in the future: | |
| F6.1 | | Accounting | MCC |
| F6.2 | | Financial control | MCC |
| F7.0 | | Provide the company's projected long-term sustainable growth rate post term of financial projections | SNV |
| | | INPUT CATEGORY G: TECHNICAL PERSONNEL | |
| G1.0 | | For each important research and development (R&D) employee, provide the following criteria: | |
| G1.1 | | Name | Text |
| G1.2 | | Position | MC |
| G1.3 | | Primary enterprise product or service in which person is involved | MC (A2.1, A5.1 "Name") |
| G1.4 | | Years of experience related to product or service in which person is involved | SNV |
| G1.5 | | Highest level of education obtained | MC |
| G2.0 | B2.1 > 0<br>B2.2 > 0<br>B2.3 > 0<br>B2.4 > 0 | How is each product inventor currently associated with the enterprise: | |
| G2.1 | | Inventor (B3.5, "Name") | MC |
| G3.0 | | Does the company currently have a CTO or development manager in place? | Y/N |
| G4.0 | G3.0 = Y | What is the name of the company's CTO or development manager? | Text |
| | | INPUT CATEGORY H: MANAGEMENT | |
| H1.0 | | Provide the compensation of each executive and management employee for each historical fiscal year (FY) in terms of the following criteria: | |
| H1.1 | | Cash compensation for each employee in each historical FY | SNV |
| H1.2 | | Equity compensation for each employee in each historical FY | SNV |
| H2.0 | | Provide the following characteristics for each executive and management employee: | |
| H2.1 | | Position description of each employee | MC |
| H2.2 | | Name of each employee | Text |
| H2.3 | | Highest level of education level obtained | MC |
| H2.4 | H2.3 | Was undergraduate not completed due to pursuit of entrepreneurial opportunity? | Y/N |
| H2.5 | H2.3 | Type of undergraduate degree | MC |
| H2.6 | H2.3 | Type of graduate degree | MC |
| H2.7 | | Years of total executive experience | SNV |
| H2.8 | | Years of experience in the last 15 years relevant to target industry | SNV |
| H2.9 | | Years of experience in start-up environment | SNV |
| H2.10 | | Years of experience in the last 15 years working in a similar company | SNV |
| H2.11 | | Years of marketing experience | SNV |
| H3.0 | | Which, if any, currently unfilled executive and management positions will require filling in the next 2 years: | |

-continued

| | | | |
|---|---|---|---|
| H3.1 | | Each position | MC |
| H3.2 | | Anticipated months from now that each position will be filled | MC |
| H4.0 | | Have any management personnel previously founded a company(s) | Y/N |
| H5.0 | H4.0 = Y | How many company(s) have been founded collectively by all executive and management personnel and how many of those still operate as standalone or acquired entities: | |
| H5.1 | | Company(s) founded | SNV |
| H5.2 | | Company(s) still operating | SNV |
| | | INPUT CATEGORY I: CAPITALIZATION/VALUATION | |
| I1.0 | | Where available, provide the following anticipated financing principal obligations and receipts for the current and each future fiscal year (FY) (include capital receipt from current offering): | |
| I1.1 | | New debt borrowing for the current and each future FY | SNV |
| I1.2 | | New equity issuance for the current and each future FY | SNV |
| I1.3 | | Existing debt principal repayment obligations for the current and each future FY | SNV |
| I2.0 | | Provide the following company capitalization characteristics of each existing executive and management employee: | |
| I2.1 | | Total contributed equity capital for each employee | SNV |
| I2.2 | | Total contributed debt capital for each employee | SNV |
| I2.3 | | Current equity ownership for each employee (fully diluted, pre-investment) | SNV |
| I3.0 | | Provide the following details of the enterprise's current investment capital needs: | |
| I3.1 | | Amount of capital needed | SNV |
| I3.2 | | Type of capital investment available | MCC |
| I4.0 | | Provide an itemization of how investment funds will be utilized: | |
| I4.1 | | Each use | MC |
| I4.2 | | Capital budget for each use | SNV |
| I5.0 | | Does the enterprise currently have an estimated pre-money valuation? | Y/N |
| I6.0 | | Would you like to use the valuation calculator to establish a competitively priced pre-money valuation for the enterprise based on a comparison to your peer group? | Y/N |
| I7.0 | I5.0 = Y I6.0 = N | Provide the enterprise's estimated pre-money valuation | SNV |

It may be noted that in the preferred embodiment the input question order and categorical organization are strategically performed in order to minimize the ability of the enterprise-user to perform top-down analytical rationalization and reconciliation of answers, i.e., "game" the system. In addition, the input question solicitation within each query category is structured to dynamically adapt to the maturity and information availability of the enterprise through the use of production rules as described in, but not limited to, the second column of the above referenced table.

Other classes of information may be input in a preferred embodiment, including electronic business plans, digital video and images, such as images of management personnel, electronic information regarding products or services, electronic information regarding tangible assets, and additional general information that may be used to characterize the enterprise. The enterprise characterization block 12 may also provide to the enterprise-user the ability to block access to view by investor-users, certain classes of information for purposes of confidentiality. An investor-user wishing to review such information will thus be required to contact the enterprise through an internal communications system in order to see such information. Access to the information will then be made available through an internal communications system if consent is granted. Finally, the preferred embodiment includes the capability at block 12 for the enterprise-user to save his or her work if unable to complete all the queries at one session so that they may be completed later. It further includes the functionality to allow the enterprise-user to update or correct any previously entered information at a later time.

For a majority of enterprise agents entering a capitalization or liquidation phase, determining a fair and competitive valuation for their respective enterprise is often one of the most difficult aspects. During the enterprise characterization process of block 12, enterprise-users are offered an automated enterprise valuation calculator that enables enterprise-users to compare and competitively establish the offering valuation of their respective enterprise based on a comparison to aggregate peer valuation. This process is comprised of the following steps. In the first step, the valuation calculator incorporates the risk-adjusted valuation for the specific enterprise as computed by enterprise analyzer block 42 described below. In the second step, the valuation calculator solicits from the enterprise-user a premium or discount relative to the median or mean RA-IRR of the enterprise peer group that the enterprise-user desires. For example, the enterprise-user can dictate that the enterprise-specific offering valuation be adjusted so that the corresponding enterprise-specific RA-IRR is 5% below the peer median RA-IRR. In the third step, the valuation calculator computes an enterprise-specific offering valuation that when reconciled with the valuation from step one through the process described below for block 76, results in an enterprise-specific RA-IRR that compared to the peer median or mean RA-IRR, duplicates the discount or premium value set in step two by the enterprise-user.

Input is preferably provided by enterprise-users at enterprise input block 12 and is captured via web-based template forms that dynamically conform to the specific domain cross-section of each enterprise (i.e., enterprise type and maturity). Template conformity is achieved through an initial enterprise type characterization that determines the specific relevant template and, subsequently, through solicitations during the input process for qualifying information that enable a conditional presentation of enterprise-specific information solicitation. The input solicited consists primarily of ten (or more) categories of enterprise attributes (e.g., education level of management) that serve as the independent enterprise parameters (IEPs) for the system, and empirical information for the archival section of enterprise data 18; a list for the preferred embodiment is described above. Inherent design modularity through categorical organization of input criteria preferably allows for ongoing alteration of input criteria. Additional parameters that are non-essential to the output of the system may also be solicited, a feature that obscures the computational focus of the system (i.e., prevents gaming of the system and reverse-engineering) and provides additional empirical information for the archival section of enterprise data 18.

Enterprise data block 18 is a data storage area that is fed by information entered by the enterprise-user at input block 12. In the preferred embodiment, enterprise data does not necessarily represent a single physical data storage area; instead, it is a logical construct that may represent areas of multiple data storage areas. More specifically, enterprise data block 18 is an information content component of a database (archival database 43 in FIG. 3, as more fully described below) containing empirical and longitudinal information consisting of original and post-funding performance characteristics related to the enterprise. Enterprise data-block 18 is also an information content component of a database (knowledge base 40 in FIG. 3, as more fully described below) containing analyzed and statistical correlation information related to the enterprise that serves as a proprietary base of statistical information.

Enterprise characterization block 12 feeds information to analysis block 22, which will be described more fully below with reference to FIGS. 3-6 and 8. Based on a general enterprise characterization that originates at enterprise-user input block 10 and that is processed at enterprise characterization block 12 for analysis in block 22, various outputs for the enterprise-user are delivered at block 24. This general characterization by the enterprise-user consists of the type, location, and funding stage of the enterprise and also the degree of enterprise planning and information availability. Without necessarily incorporating the systems described in FIGS. 3-6 and 8, analysis block 22 produces information at enterprise-user output block 24 that may preferably consist of the following. This output qualifies for the enterprise-user the degree of information adequacy for full submission. It preferably provides the capability to inform enterprise-users of the number of member investor-users who possess an investment focus profile that matches within a predetermined statistical significance the profile of that particular enterprise-user's enterprise. It also provides the capability to inform the enterprise-users of any planning or information inadequacies related to the enterprise and which are necessary for comprehensive enterprise characterization at block 12.

Another feature of enterprise output block 24 is that, once an enterprise is available for investor-user view in the system, the enterprise-user has the capability to automatically check the response rate of investor-users to the enterprise investment opportunity, including preferably the number and general composition characteristics of investor-users who have demonstrated interest in the enterprise through various levels of content exploration. Such levels may include, for example, access to the enterprise summary, access to the enterprise business plan, and initiation of a communication with the enterprise-user. The enterprise-user may also review feedback that may be anonymously provided by investor-users through the system via the internal communication system.

Another type of possible communication from an investor-user at output block 24 is that, in the preferred embodiment, the enterprise-user may receive notification of an investor-user request for controlled release and disclosure of previously obscured enterprise information. The notification may be made anonymously, but may also include a non-identifying profile of the investor-user. The profile may preferably include an integrity ranking of the investor-user that aggregates and quantifies any negative feedback on the specific investor-user from other enterprise-users.

Turning now to investor-user input block 14 and investor-user requirements block 16, potential investor-users preferably have the capability to create and save for recurring use multiple differing enterprise search query profiles, each of which produces a list of enterprises that possess enterprise-related attributes inclusive of the specific criteria constraints of the search query profile. Various search capabilities are included in the preferred embodiment. Investor-users have the capability to construct specific enterprise search query profiles that can incorporate an extensive list of customizable search criteria in the form of enterprise attributes. To satisfy the varying degrees of search scope desired by investor-users, the search input form that is a part of investor-user requirements block 16 preferably requires a minimum of three criteria (e.g., enterprise type, maturity, and location) while also providing a comprehensive list of additional criteria for advanced investor-users who wish to perform more specific searches. The investor-user may create original search query profiles that can be constrained by one or more enterprise-related criteria, where each independent criteria restriction may preferably be quantitatively or qualitatively varied to form an inclusive range or single restrictive end point. Such criteria include all of the enterprise-related attributes input by the enterprise-user at block 12, as well as the enterprise classification type and funding stage; the location of the enterprise categorized by region, state, city, zip code, or distance from a chosen reference point; and the risk-adjusted internal rate of return (RA-IRR) and risk value (the computation of these values is described below). In addition, investor-users have the capability to select the metric by which matched enterprises are sorted in investor-user output block 26, these metrics being the enterprise RA-IRR and risk value. Investor-users have the capability to save multiple specific profiles for recurring use when performing real-time searches of the enterprise database. Investor-users also have the capability to automate search queries so that an automatic alert (e.g., by email through the internal communication system) is communicated to the investor-user in near real time when an enterprise-user submits enterprise information that matches the particular investor-user's enterprise search profile. The investor-user's enterprise search characteristics are retained and stored in investor-user data block 20 for recurring use by the investor-user and for internal statistical analysis.

The investor-user preferably has the capability to adjust any of the enterprise search criteria at investor-user requirements block 16 through direct manipulation of an enterprise search performance diagram, presented through a graphical user interface appearing at investor-user terminal 4. Investor-users have the capability to customize, within controlled constraints and for recurring use, the scoring parameters, computation methods, and data source (i.e., knowledge base block 40) used at analysis block 22 in the computation of enterprise RA-IRR. Specific investor-user customization capabilities include, but are not limited to, the capability to adjust weighting parameters as used by the risk model; the capability to select the valuation modeling method employed by analysis block 22 for computation and aggregation of perpetual enterprise risk-unadjusted free cash flows, including but not limited to: linear perpetual growth, multi-stage non-linear perpetual growth, multi-stage partial-linear perpetual growth, and residual income method models. Alternatively, the investor-user may have the capability to avoid the perpetual assumption and requirement of the methods above by selecting a valuation modeling method that employs comparable valuations of enterprise peers. The investor-user preferably has the capability to dictate the risk model method (risk model #1 or #2) that is employed by analysis block 22 for risk adjustment; the capability to adjust the default data correlations (i.e., knowledge base block 40) used by analysis block 22; and the capability to select from a list of available enterprise-related attributes, with specific attributes to be displayed with each enterprise listed.

It is anticipated that a significant number of sophisticated investor-users will wish to augment the relation and significance of the default empirical and longitudinal correlations that are referenced by the system for scoring and which are contained in the knowledge base. This customization function allows the scoring and resulting sorting of enterprises to conform, within controlled constraints, to the specific enterprise screening preferences of the investor-user. In the preferred embodiment, investor-users have the capability to perform this augmentation through direct graphical manipulation of the default correlations and their significance. Additionally, when performing an enterprise search and featured at block 26, a feedback system provides investor-users an intuitive and heuristic graphical summary of resulting enterprise search and sort output in the form of enterprise output composition characteristics relative to prior customization iterations and similar enterprise peer characteristics. These investor-user augmentations of default correlations are retained in investor-user data 20 for recurring use by the investor-user and provide a source of information that is used to establish independent investor-user decision-making correlations, and to assist in resolving multi-colinearity uncertainties inherent to correlation development block 50.

Investor-user data block 20 preferably comprises an information content component of archival database 43 containing empirical and longitudinal information related to investor-user enterprise screening characteristics, analysis customization characteristics, and investment decision characteristics. Investor-user data block 20 also preferably comprises an information content component of knowledge base 40 containing analyzed and statistical correlation information that serves as a proprietary base of statistical information that is referenced by multiple components of the system. In addition to storing information originated at block 16 and 26, investor data block 20 also stores information originated at block 101 and 111.

The output generated by analysis block 22 at investor-user output block 26 for potential investor-users may preferably include a searched and sorted listing of enterprises, with a limited summary accompanying each specific enterprise in listing. It may also include the capability to provide with each specific enterprise summary a number of associated enterprise attributes that are specifically selected from a list of available attributes by the investor-user.

In the preferred embodiment, much of the information generated at investor-user output block 26 is graphical in form. It may include the capability of providing investor-users with a report of the enterprise search results that characterizes the enterprise composition statistics of the search and allows for heuristic refinement of the search parameters through direct manipulation by means of a graphical user interface, this information of which is stored in investor data block 20. The graphical enterprise search summary profile includes each enterprise-related criterion adjusted from the default value in the search profile displayed on the x-axis of a graphical summary. Each such criterion features a corresponding horizontal or vertical graphical bar that quantifies the portion of enterprises included or excluded from the group inclusive of the chosen criterion.

Investor-user output block 26 further includes the capability for the investor-user to select and automatically receive for each unique enterprise a summarized analysis that includes interactive functionality and quantitative and qualitative information that characterizes the specific enterprise investment opportunity. Such information may preferably include a probabilistic quantification of the enterprise RA-IRR through a probability density profile chart that illustrates the computed RA-IRR as a function of corresponding probability for each of the range of possible RA-IRR values. Such information may also include an RA-IRR probability density profile for the median or mean of relevant peer enterprises; a probabilistic quantification of the enterprise risk profile through a radar illustration for each of the risk categories quantified by the method; and a categorized risk profile for the median or mean of relevant peer enterprises.

Investor-user output block 26 also preferably includes the capability to provide, through a database function in each enterprise summary, an anonymous quantification of the amount of specific enterprise page views by all investor-users, including but not limited to the number of investor-users viewing that specific enterprise summary; the number of investor-users viewing that specific enterprise business plan; and the number of investor-users contacting the enterprise-user. It also includes the capability for the investor-user to, when specific categories of enterprise information are obscured from unauthorized view by investor-users, request authorization from the enterprise-user for access to enterprise information through an internal communication system. More generally, it includes a communication capability that allows the investor-user to contact the enterprise-user via the internal communication system with or without disclosure of the investor-user's identity.

Other features according to the preferred embodiment of investor-user output block 26 are the capability for the investor-user to tag an enterprise with a certain hierarchical rank relative to other enterprises, and the capability for the investor-user to remove any enterprise from inclusion in the list that is generated for that investor-user in response to a search. Further, the investor-user preferably has the capability to indicate a note of interest in a specific enterprise for purposes of a syndicated investment with other potentially interested investor-users, which, once enacted, may be seen by other investor-users who select the summarized analysis for the specific enterprise. Finally, investor-user output block 26 preferably includes the capability for an investor-user, in cooperation with an enterprise-user, to automatically obscure a specific enterprise from view by other investor-users in their search results if and when the level of investment discussions between the investor-user and enterprise-user warrant authorization by both parties of this action. If investment discussions do not result in a mutually satisfactory result, the obscured enterprise can be reopened for viewing by the enterprise-user.

Monitoring block 28 of FIG. 2 provides the capability to monitor the progress of enterprises over a period of time. Its function will be described in more detail below with respect to FIGS. 10-14. It receives input and generates output for enterprise-users at block 114/116, and receives input and generates output for investor-users at block 101/112 and 111/113. Monitoring block 28 uses data from enterprise data block 18 and investor data block 20, and also provides data to these blocks for purposes as will be described below.

Figure 3:
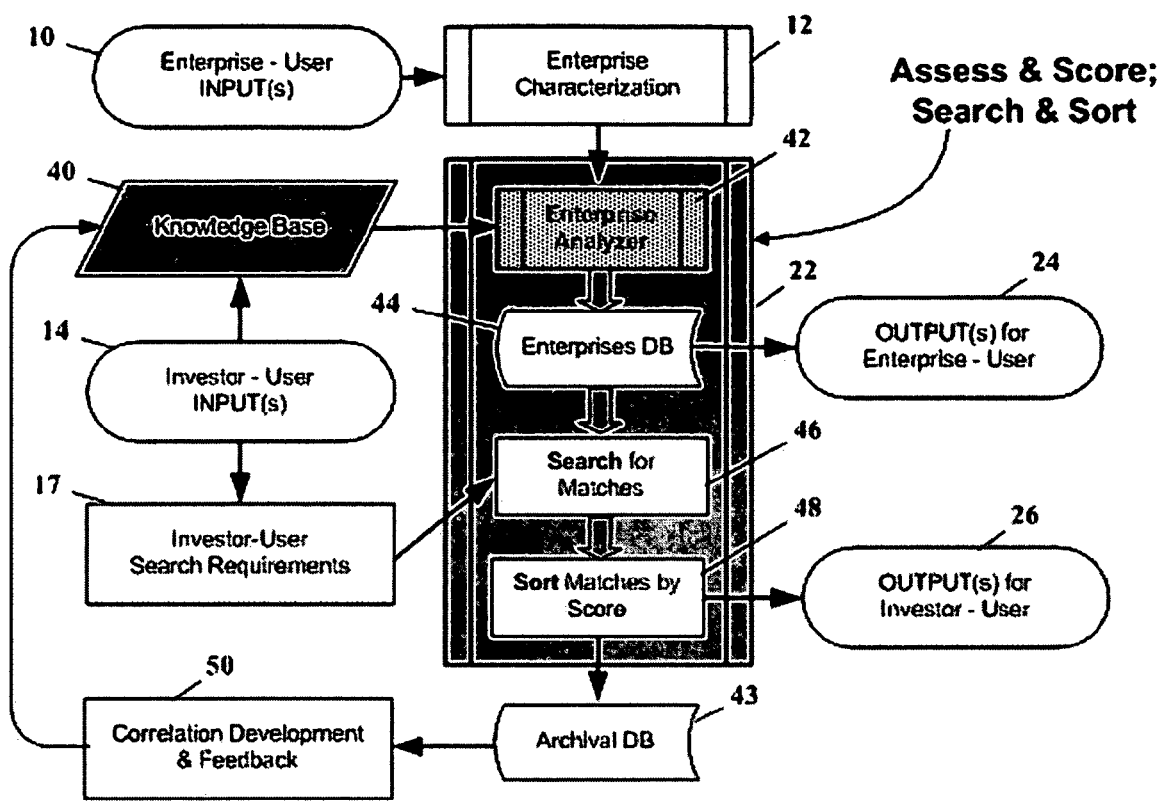
FIG. 3 is a diagram depicting logical elements of an assess and score and search and sort subsystem according to a preferred embodiment of the present invention.

Referring now to FIG. 3, the functionality of analysis block 22 of FIG. 2 may be described in greater detail, along with a more detailed description of certain of the components identified with reference to FIG. 2. Knowledge base 40 comprises a set of default probabilistic reference correlations. These correlations are generated as a result of an ongoing statistical analysis of the data contained in archival database 43. This proprietary base of statistical information is referenced by multiple components of the system of the preferred embodiment and functions as dynamic reference knowledge for this system. The dynamic nature of this information reference system enables and supports the architectural modularity inherent to the system. Inherent modularity in the computation architecture of the system facilitates independent alteration of component functions and, as a result, inclusion of evolving dynamic reference information contained in knowledge base 40. The sorting of enterprises is based on a scoring assessment that consists of either the future enterprise RA-IRR or probability of failure (risk value), of which are independently computed by enterprise analyzer block 42 and risk-model block 68, respectively. The function of enterprise analyzer block 42 and risk-model block 68 will be described in greater detail below.

Enterprise-characterizing information obtained through enterprise characterization block 12 and associated system output from enterprise analyzer block 42 are retained in enterprise database 44 for efficient extraction. The output from enterprise database 44 may be enterprise-user output block 24, as described earlier with reference to FIG. 2. As with previous data storage areas described, enterprise database 44 represents a logical construct associated with a particular type of information, and may or may not be associated with a separate physical database from other information, such as described above with respect to archival database 43 and knowledge base 40.

Enterprises characterized in enterprises database 44 are searched for matches with the input parameters from investor-user search requirements block 17 at search block 46. Those that possess attributes that are outside the range of acceptable investor-user search parameters are excluded from the output of match search block 46, are not sorted at sort block 48, and do not appear in the resulting investor-user output at block 26. If, however, a specific enterprise is: 1) excluded from the output due to predetermined minor statistical deviation(s) from the range of acceptable investor-user search parameters and, 2) possesses a RA-IRR score that is greater or a risk value that is less than a predetermined portion of the enterprises inclusive in the range of acceptable search parameters, then that specific enterprise is preferably included as a "relaxed" match at investor-user output block 26. Enterprises in enterprises database 44 that are inclusive to investor-user search queries as determined at match search block 46 are sorted in descending order (i.e., ranked) according to their specific enterprise RA-IRR score generated by enterprise analyzer 42 at sort matches block 48 or sorted in ascending order (i.e., ranked) according to their specific enterprise risk value score generated by risk-model 68 at sort matches block 48. As a result of the processes performed by enterprise analyzer 42, search block 46, and sort block 48, investor-users are presented a matched and ranked list of enterprises at investor-user output 26.

It may be noted that archival database 43 of the preferred embodiment is a proprietary database containing enterprise-related endogenous and exogenous, empirical and longitudinal information that includes but is not limited to original enterprise attributes (e.g. CEO experience, enterprise maturity, financial projections, etc) and the associated performance characteristics of the enterprise. Investor-user enterprise search and screening characteristics, their investment decisions, and other forms of exogenous information are also captured by archival database 43. The information accumulated by the database originates from various sources. One source is the original enterprise input captured at enterprise input block 12. Another source is the enterprise monitoring sub-system 28 of the preferred embodiment, as will be described more fully below. Investor-user input from investor-user input block 14 is stored in archival database 43 as well. In addition, archival database 43 contains output from enterprise analyzer block 42 and survey information from enterprise-users and investor-users who have used the system. Finally, information from various third-party external sources may be included.

The relationship between knowledge base 40 and archival database 43 is controlled by correlation development and feedback block 50. Archival database 43 may be statistically analyzed to identify and quantify all potential and useful forms of parametric correlation, including but not limited to the correlations between original enterprise attributes and their relation to resulting enterprise performance, and the screening characteristics and investment decisions of investor-users. These correlations are then stored as statistical information at knowledge base 40, for reference and use by multiple components of the system. Continuous data mining and correlation analysis of archival database 43 at correlation development and feedback block 50 provides for the discovery of new correlations and dynamic quantitative adjustment of existing correlations within knowledge base 40. This active feedback mechanism enables the modular probabilistic prediction systems to incorporate new statistical reference information and conform their predictive capability to ever-changing systematic and unsystematic conditions that affect the performance of enterprises and investment decisions of investors.

Figure 4:
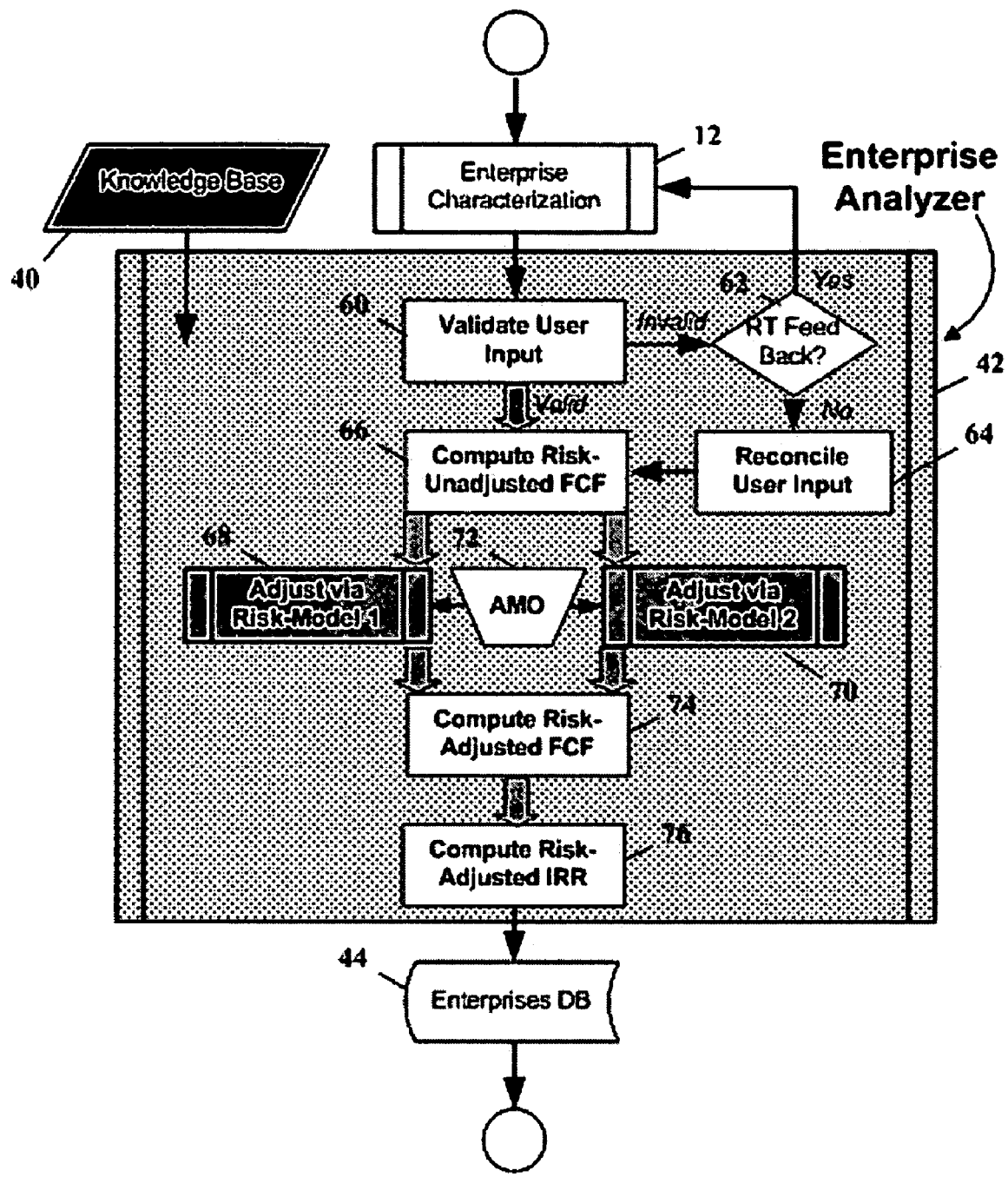
FIG. 4 is a diagram depicting logical elements of an enterprise analysis subsystem according to a preferred embodiment of the present invention.

Referring now to FIG. 4, the function of enterprise analyzer block 42 may be described in greater detail. Information arriving through enterprise characterization block 12 is fed to validate user input block 60. This step provides an automated and augmentable method for the validation of specific independent enterprise parameters (IEPs) inputted by the enterprise-user in order to minimize invalid or inconsistent IEPs, and hence minimize invalid output by the system. Depending on the specific IEPs to be validated, one or a combination of the following reference comparison methods is used to perform validation of the IEPs at validate user input block 60. In one method, validation of specific IEPs is performed through comparison to casually related endogenous reference IEPs from the same enterprise by direct relation to single IEP references or a combinatory relation to multiple IEP references. For example, many enterprise input parameters that are inherent to income, balance sheet, and cash flow statements are interrelated such that direct or indirect mathematical comparison of these parameters can test for validation. For other types of input, validation of specific IEPs may be performed through comparison to casually related exogenous information referenced from knowledge base 40. Examples of such information may include third-party economic projections and empirical enterprise peer information. As a hybrid method, information may be validated through a combination of exogenous information referenced from knowledge base 40 and casually related endogenous reference IEPs.

Depending on the specific IEP to be validated, various validation methods may be utilized. For IEPs that are mathematically related and that inherently require mathematical precision (such as accounting balances involving financial values), validation is achieved by mathematically comparing two or more IEP values in a predetermined relationship (e.g., equation) to identify inconsistencies between values. To identify the specific IEPs that are likely incorrect in these comparisons, multiple relationships that incorporate similar IEPs may be employed to narrow down options and point to the likely incorrect IEP. When this method cannot accurately be applied due to inherent imprecision and uncertainty in the comparison, the range of values relative to a certain predetermined standard error or statistical significance about the median or mean value of reference parameters may be compared to IEPs in order to identify specific IEPs that are not consistent with the relevant range of reference values and, therefore, must be invalid.

It may be noted from the description of various validation techniques above that some types of information may be inherently validated in real time, that is, as they are input by the enterprise-user at enterprise characterization block 12. If an input is in fact determined to be invalid, the decision to determine whether real-time feedback may occur is shown at decision block 62. For these specific IEPs that may be validated in real time, the enterprise-user is made aware of any invalidated IEPs immediately and requested to appropriately adjust (i.e., reconcile) the invalidated IEPs and re-enter correct IEPs. When invalidated IEPs can be identified in this manner, enterprise-users are made aware of the likely specific invalidated IEP in order to assist the enterprise-user in adequately reconciling invalidated IEPs.

When invalid input cannot be reconciled in real time through enterprise-user feedback, processing moves to reconcile user input block 64. Reconciliation is performed on each specifically invalidated IEP by one of various methods. One method is automatic adjustment of invalidated IEPs to a value that achieves the precision inherent to a relevant predetermined mathematical relationship, such as those inherent to financial accounting parameters. When neither real-time feedback nor automatic adjustment can accurately be applied due to inherent imprecision and uncertainty in the comparison, reconciliation of invalidated IEPs occurs through automatic adjustment of these IEPs to the nearest boundary of the range of values of a predetermined standard error or statistical significance about the median or mean value of relevant reconciliation parameters referenced from knowledge base 40.

At compute risk-unadjusted free cash flow block 66, the system utilizes validated financial IEP projections from validate user input block 60 and, if required, reconciled financial IEP projections from reconcile user input block 64 to compute, into perpetuity, risk-unadjusted free cash flows available to the enterprise (i.e., excluding principal and interest debt liabilities); risk-unadjusted free cash flows available to enterprise equity holders (i.e., including principal and interest debt liabilities); and economic residual income. As described above, investor-users have the capability to dictate the valuation modeling method the system utilizes for computation of perpetual enterprise free-cash flows or economic residual income. Alternatively and as described above, investor-users also have the capability to avoid computation of perpetual enterprise free cash flows and instead dictate that the system incorporate an enterprise terminal value based on comparable peer enterprise valuation metrics obtained from knowledge base 40.

At the completion of processing at compute risk-unadjusted free cash flows block 66, the output in the preferred embodiment flows to both adjust via risk-model #1 block 68 and adjust via risk-model #2 block 70. With reference to the risk model of block 68, that model computes the distribution of probable specific enterprise failure to adjust each annual and the perpetual (terminal) free cash flow or residual income parameter(s) by the corresponding probability distribution or mean value of success. This adjustment incorporates into risk-unadjusted projected free cash flow the probability of dichotomous enterprise success and failure, and thereby incorporates the probability of failure as the statistical uncertainty inherent to risk-unadjusted projected free cash flows. By contrast, with reference to the risk model of block 70, that model utilizes the distribution of probable specific enterprise free cash flow or residual income deviation from projected risk-unadjusted free cash flow or residual income to adjust each projected annual and the perpetual (terminal) free cash flow or residual income parameter(s) by the associated probability distribution or mean value of free cash flows or residual income deviation. This adjustment incorporates into risk-unadjusted projected free cash flow or residual income the probability of actual free cash flow or residual income deviation from risk-unadjusted projected free cash flow or residual income, respectively, and thereby incorporates the probability of actual free cash flow or residual income deviation as the statistical uncertainty inherent to risk-unadjusted projected free cash flow or residual income.

At adjustment method optimization (AMO) block 72, a statistical comparison of the predictive performance of the models of blocks 68 and 70 to actual longitudinal parameters from archival database 43 enables determination of the optimal default model to employ in the system. Alternatively, investor-users have the ability to choose the type of risk model to employ in their specific customization of the system at investor-user input block 16, and hence they have the ability to dictate the type of dependent statistical correlation factor to utilize: dichotomous enterprise success and failure or enterprise performance deviation from initial projections, as found in knowledge base 40.

From the adjustment to risk-unadjusted projected free cash flows or residual incomes performed through either method of blocks 68 and 70, the compute risk-adjusted free cash flow block 74 serves to compute and generate a probabilistic distribution or mean value of risk-adjusted free cash flow or residual income for each projected fiscal year and into perpetuity. Then at compute RA-IRR block 76, the system computes the specific discount rate that equates and reconciles all probability-distributed or mean values of risk-adjusted free cash flows or residual incomes with the independent current enterprise valuation provided by the enterprise-user at block 12. The resulting discount rate that equates and reconciles these values is equivalent to an independent estimate of the future enterprise RA-IRR that can be expected by investor-users. The resulting information may be stored in the enterprise database 44. Again, enterprise database 44 is a logical construct, and may or may not correspond to a separate physical data storage area.

Figure 5:
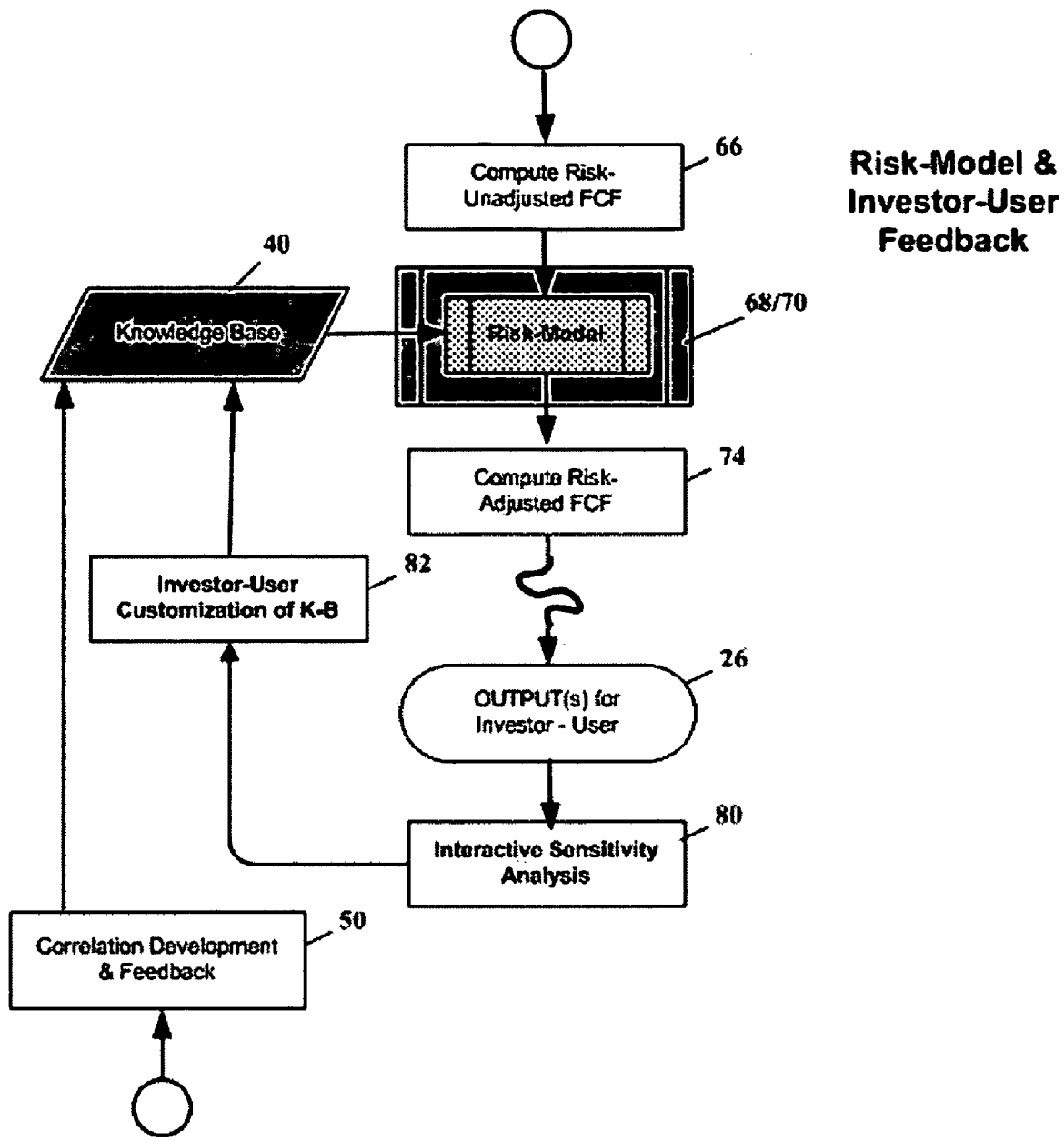
FIG. 5 is a diagram depicting logical elements of a risk model subsystem according to a preferred embodiment of the present invention.

Referring now to FIG. 5, the risk model processing of blocks 68 and 70 of FIG. 4 may be described in more detail, including the investor-user feedback mechanism incorporated into that processing. For purposes of the explanation of FIG. 5, the models of blocks 68 and 70 preferably work in an identical manner. The risk models of blocks 68 and 70 effectively combine various standard statistical operations in a process that is capable of incorporating the feedback of dynamic reference correlations from knowledge base 40. The risk models provide a method for quantifying the probabilistic systematic and unsystematic risk (i.e., uncertainty) inherent to enterprise-specific expected free cash flow or economic residual income, and hence provide an incorporation of the uncertainty associated with the cash flow parameters that serve as the standard basis for asset valuation. Enterprise risk is quantified in this system through parametric comparison of specific enterprise-related endogenous and exogenous attributes to corresponding risk-correlated parameters of a relevant cross-section of enterprise peers. This method uses empirically based parametric risk correlations to quantify the level of risk representative of each enterprise-related characteristic attribute.

The quantified risk values are statistically aggregated in a probability distribution and mean value, herein called the risk distribution and risk value. Computation of the risk distribution and risk value incorporates probabilistic risk functions that are effectively weighted according to the relative statistical significance of the associated empirical reference risk correlations. In defining the dependent variable to be representative of enterprise risk and correlated with enterprise-related endogenous and exogenous attributes in knowledge base 40 and used in the risk modeling steps of blocks 68 and 70, two primary parameters are most significant in relation to the uncertainty in expected enterprise free cash flow or residual income. The risk model of block 68 from FIG. 4 (risk model #1) utilizes dichotomous enterprise success and failure as the dependent parameter and proxy for uncertainty. The risk model of block 70 (risk model #2) utilizes the empirical degree of actual free cash flow or residual income deviation from expected free cash flow or residual income (respectively) as the dependent parameter. Regardless of the dependent parameter employed, the same computational process described herein is utilized for correlating the dependent parameter with enterprise-related endogenous and exogenous attributes and for determining enterprise-specific risk.

Figure 6:
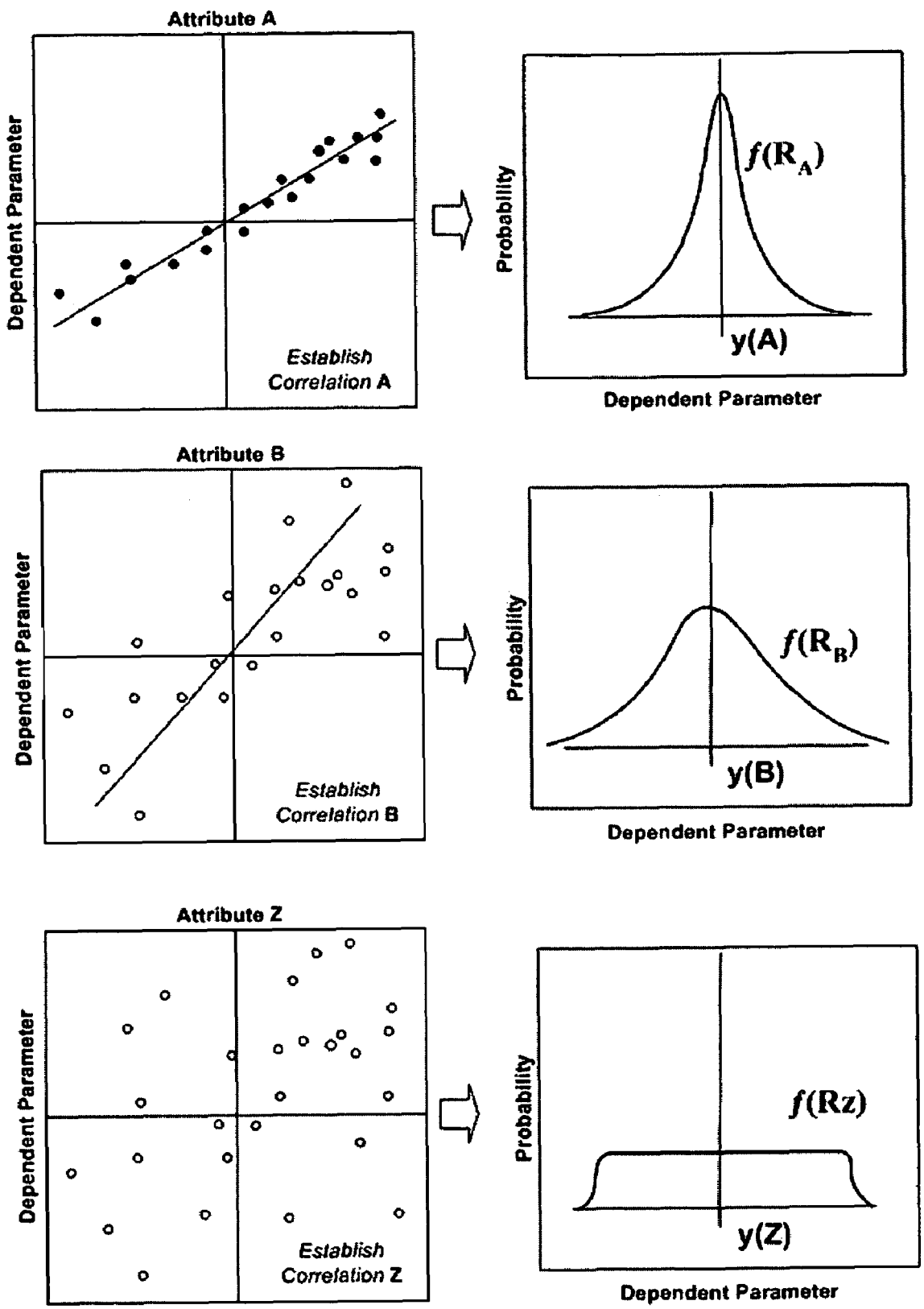
FIG. 6 is a diagram depicting exemplary risk-associated parametric correlations according to a preferred embodiment of the present invention.

FIG. 6 graphically represents the method for identification and establishment of correlations between enterprise-related attributes and the dependent parameter, and conversion of those correlations to probability density functions with associated mean values. The graphs on the left side of the figure depict known data for differing enterprise-related attributes for a sample data set. Such graphs can be processed to yield distributions for the dependent parameter, as shown to the right side of the figure. Different values of an enterprise-related attribute lead to different distribution means.

Although empirical data suggest that standard linear curve fitting appropriately models the data in many cases (as shown in the graphs on the left side of FIG. 6), non-linear curve fitting is implemented by standard methods if necessary in a preferred embodiment of the invention. Where non-linear relationships that cannot be reduced to a simple linear model are found, more sophisticated statistical algorithms and programs are known in the art that can fit non-linear models as complex as are necessary. The mathematical form of the model is identified such that the appropriate statistics program can calculate the values of the parameters that give the best fit to the data. For example, a typical method is to minimize the sum of the squares of the residuals. Nonlinear parameter estimation is intrinsically more difficult than linear curve fitting, but if the data indicate such non-linearity, appropriate algorithms are implemented to allow the determination of needed relationships. This process is explained in Gozalo, Pedro et al., "Local Nonlinear Least Squares: Using Parametric Information in Nonparametric Regression," Journal of Econometrics 99(1), pp. 43-106 (November 2000), and Kachigan, Sam Kash, Multivariate Statistical Analysis: A Conceptual Introduction (Radius Press 1991), both of which are hereby incorporated by reference herein.

Although in FIG. 6 the distributions are shown as being symmetrical, this condition is not a necessary requirement for the correlation to be established and used in the calculation of a risk distribution. In addition to correlations between enterprise-related attributes and the dependent parameter, differing attributes may be correlated with each other. For example, the ability to obtain debt capital and the educational level of the business owner (both significant factors related to new business development and survival) are believed to be interdependent. Any enterprise-related attribute that is highly correlated with another attribute provides new information at a lower weight than if that attribute were independent. Here again, if the relationship is nonlinear, ordinary correlation values may not fully describe the degree to which two enterprise-related attributes may be related. Partially enabled by acquired data, properly combining evidence in such cases may be done using one as the prior in a Bayesian analysis, where the posterior is the combined evidence provided by the probability density functions of the non-independent parameters. This process is explained more fully in Gelman, Andrew et al., Bayesian Data Analysis (Chapman & Hall/CRC 2000), and Gomez-Deniz, E., "The Esscher Premium Principal in Risk Theory: A Bayesian Sensitivity Study." Insurance Mathematics and Economics 25, pp. 387-395 (1999), both of which are hereby incorporated by reference herein.

Data to be used in the calculations of the risk distribution and risk value must be organized on a common basis to minimize complexity in those calculations. Because of the large range of values associated with input data, sample size variations between the business types, and other factors, normalization procedures are preferably used to ensure consistency in subsequent calculations. The issue of normalization arises again in consideration of methods to ensure case-to-case direct comparability and consistent interpretation of the risk distribution and risk value in the interactive sensitivity analysis.

To provide the reference information required for the calculations at blocks 68 and 70, data are maintained in knowledge base 40. This dynamic database is subject to ongoing correlation development as described above, with older data that have become less relevant to the current economic/business climate being replaced by updated information. This prevents obsolescence and provides for a dynamically adapting enterprise analysis system based on growing transaction volume (i.e., increased empirical and longitudinal information) and other feedback mechanisms in the system as a whole.

Referring again to FIG. 5, the system includes a component of block 16 at investor-user customization of knowledge base block 82. It provides several means for interactive investor-user input, and at this step the primary use of such input allows the investor-user to customize the computation of risk parameters using heuristic information. For example, an investor-user might recognize that the cash-flow management plans of an enterprise, perhaps reflected in an index of liquidity, are significantly more important as a predictor of (early) failure than is its perceived technology-based competitive advantage: If, on the basis of precision of the reference data (the "fit") and the data sample size, one enterprise-related attribute correlation is automatically weighted more heavily than is another, the investor-user can customize the calculation of risk distribution and risk value by adjusting the appropriate weighting factor. This investor-user customization is stored in knowledge base 40 with an association to the unique investor-user that generated the customization for recurring use by that investor-user.

Figure 7:
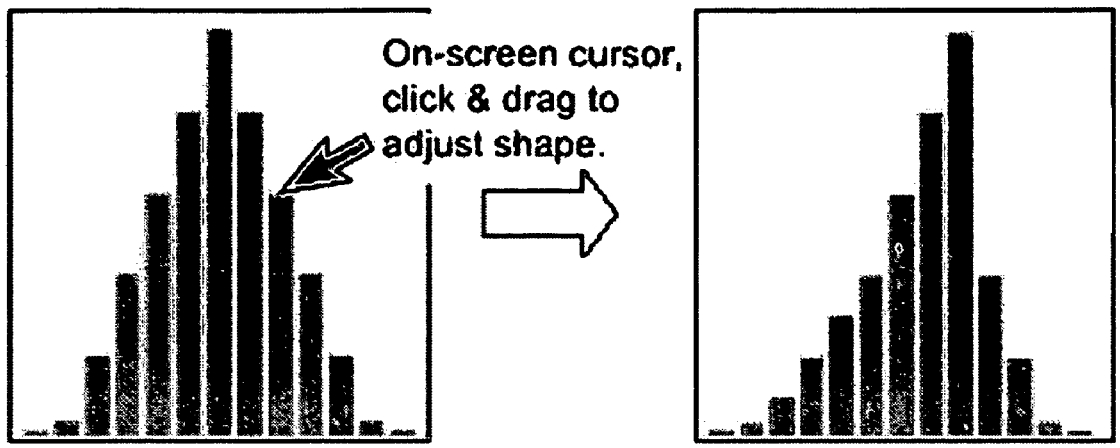
FIG. 7 is a diagram depicting an example of the results of customization of reference correlations according to a preferred embodiment of the present invention.
Figure 7:
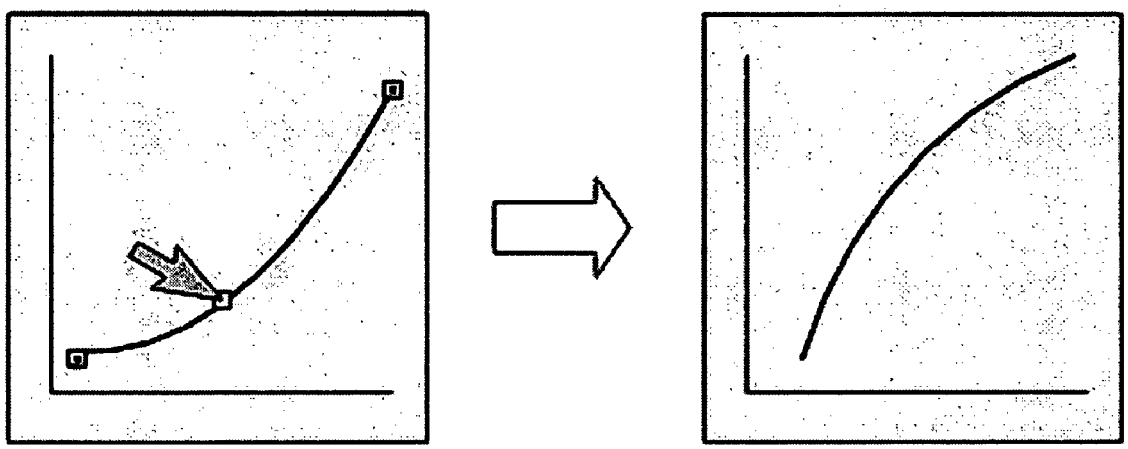

Referring now to FIG. 7 that describes the functionality of investor-user customization of knowledge base block 82, investor-users have the capability to directly adjust the reference correlations and probability density functions described above. The adjustments are made in the preferred embodiment by directly manipulating graphical images on the user interface presented to the investor-user at investor-user terminal 4. Interactive manipulation of probabilistic data represents one mechanism that enables less mathematically sophisticated investor-users to access certain statistical operations needed for sensitivity analysis. Once performed by a specific investor-user, these adjustments are stored in knowledge base 40 with an association to the unique investor-user for recurring use. Algorithms are known to allow these techniques to work with both discrete (Bernoulli, geometric, Poisson, etc.) and continuous (uniform, normal, bivariate normal, exponential, circular, etc.) distributions. The adjustments made to reference information result in related changes in computational output.

Figure 8:
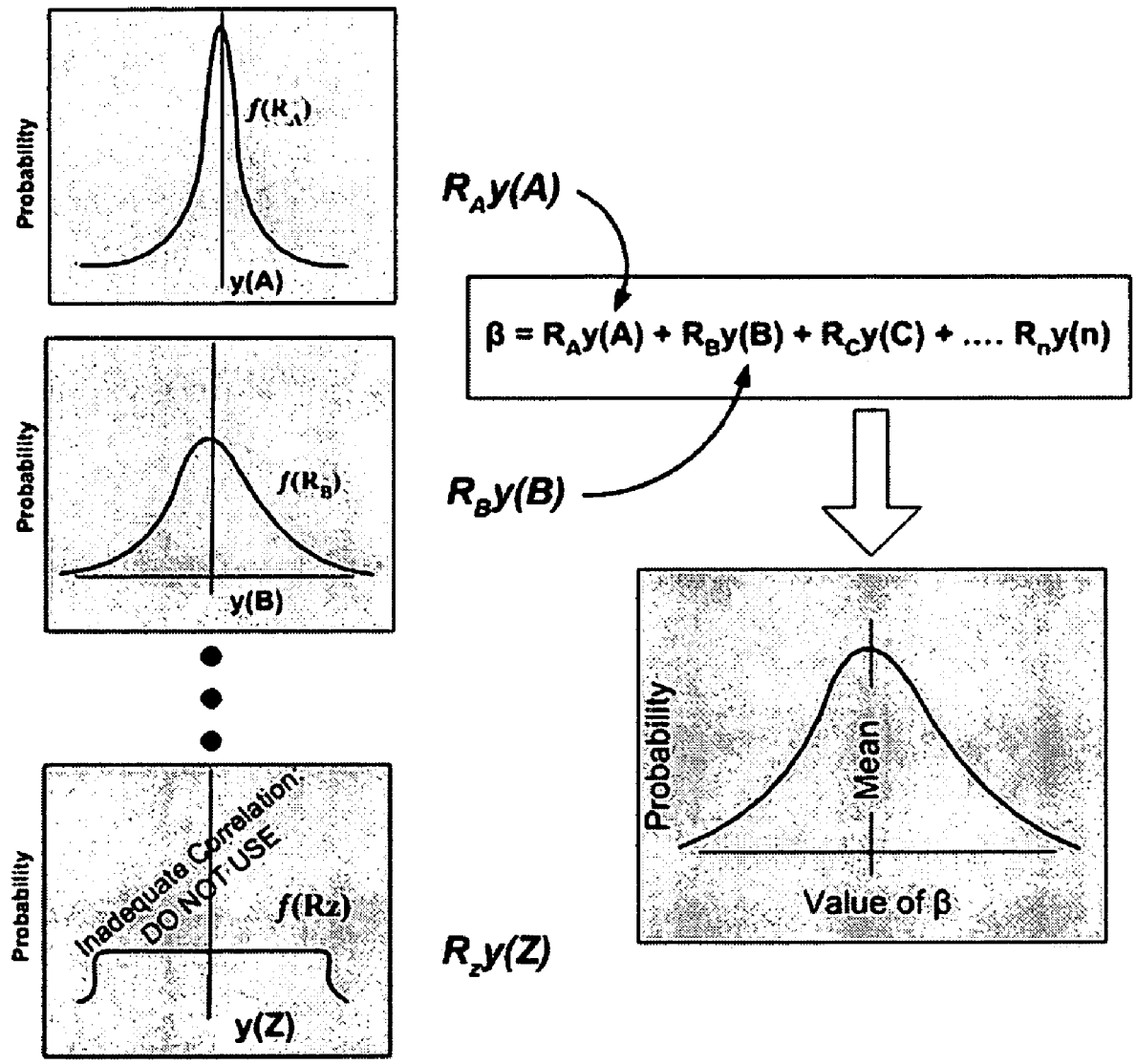
FIG. 8 is a diagram depicting an example of the computation of risk distribution and risk value according to a preferred embodiment of the present invention.

With reference now to FIG. 8, an explanation may be provided of the algorithmic processing within risk model blocks 68 and 70. The process for the determination of the risk distribution and risk value may be described as a series of discrete operations:

1. Select all statistically significant reference correlations and probability distribution functions for the specific type of enterprise being assessed. These are drawn from knowledge base 40.
2. Select for the specific enterprise being assessed the enterprise-specific attributes that correspond to the enterprise-related reference attributes identified in step 1.
3. Use the values from step 2 and the reference information from step 1 to determine the probability distribution function for the dependent parameter that is associated with each enterprise-related attribute of step 2, yielding y(A), y(B), ... y(n).
4. Determine the dependencies among enterprise-related attributes of step 1 and adjust the result of step 3 according to the process described above with respect to correlation development and feedback block 50.
5. For each enterprise-related attribute x, select R(x) from knowledge base 40, where R=f(r, n), and where r=correlation coefficient and n=sample size. R provides a weighting according to the risk predictive reliability of each enterprise-related reference attribute.
6. Using the values from steps 3 and 5, compute the risk distribution and risk value according to the equation:

$$\beta = R_A y(A) + R_B y(B) + R_C y(C) + \ldots R_n y(n)$$

This equation provides a basis for a parametric model in which each parameter has an associated probability and determines the probability distribution associated with risk.

7. Where needed and appropriate as an alternative to steps 5 and 6, use Bayesian combination of evidence with sources provided by y(A), y(B), . . . , to obtain the combined distribution y(β).

In various embodiments, the systematic methods and processes described above for block 42 and blocks 68/70 are capable of incorporating many differing parameters of an enterprise and statistical reference information in the generation of what may be defined as a multi-factor enterprise scoring value for an enterprise. This multi-factor enterprise scoring value may consist of, but is not limited to, a risk-adjusted internal rate of return and risk value for the enterprise as described above, but in alternative embodiments may include other values with utility in ranking enterprises.

Figure 9:
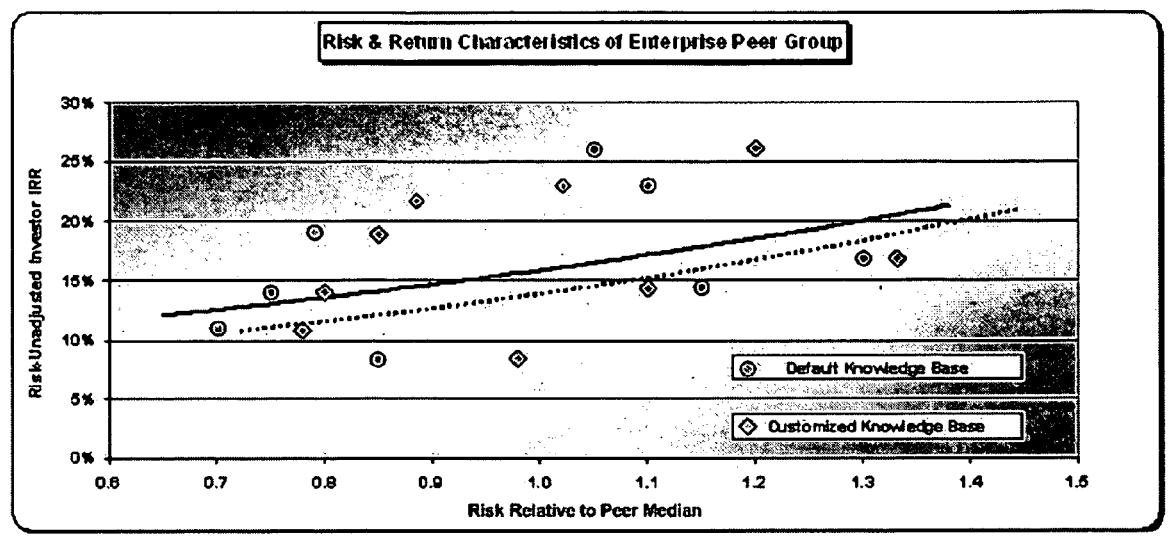
FIG. 9 is a diagram depicting an exemplary plot of heuristic feedback of knowledge-base customizations according to a preferred embodiment of the present invention.

As illustrated in FIG. 9, the system includes at interactive sensitivity analysis block 80, the capability for investor-users to view the results of the customizations to knowledge base 40 as described above. For each iterative change of the default knowledge base 40 values by investor-users, the resulting impact on enterprise risk quantification is illustrated for a chosen enterprise peer group such that investor-users can heuristically assess the effect of incremental knowledge base 40 customizations and, therefore, ultimately refine and conform the output of the overall system to specific investor-user preference(s). In FIG. 9, the effect of investor-user changes to default reference risk correlations in knowledge base 40 are shown for each enterprise within a specified peer group. While FIG. 9 demonstrates a preferred embodiment, compositional characterization of resulting enterprise peer group effects of knowledge base 40 customizations is not limited to the format shown in this figure.

Monitoring component 28 from FIG. 2 may now be described in more detail. Monitoring component 28 provides automatic and interactive techniques for investor-users to monitor the operational maturation process of enterprises and effectively identify when assistant intervention is necessary. Investor-users have the capability to utilize monitoring component 28 in two ways: (1) an automated monitoring of enterprise performance through automatic analysis and notification (i.e., an alert) directed toward the investor-user as described for automatic enterprise monitor block 110; and (2) interactive monitoring and analysis of enterprises through investor-user use of interactive analytical functions as described for interactive enterprise monitor block 140. In either case, access is provided to investor-users through investor-user terminal 4, but the software necessary for these functions preferably remains resident on server 8.

Monitoring component 28 allows investor-users to customize and construct a specific progress monitoring profile for each unique enterprise within their investment portfolio. Once a monitoring profile is established, investor-users can request the enterprise-users of their portfolio enterprises to periodically access a web-based input system that is unique to their enterprise and submit required enterprise progress information. Enterprise-users may access the monitoring system through enterprise-user terminal 2 for this purpose. Automatic use of the system provides investor-users the capability to statistically predict the future performance of the enterprise and the capability to set benchmark deviation and threshold limits for each monitoring parameter that function as triggering events and that generate automatic investor notification if triggered. Interactive use allows investor-users to perform in-depth enterprise performance analysis through use of robust charting and analysis functions that allow detailed analysis of monitoring parameters and the information provided in the automated system.

Monitoring component 28 preferably provides the following capabilities: (1) the capability to compare, for congruence, the business development progress of an enterprise with enterprise business plan projections; (2) the capability to determine and moderate causes of sub-optimal enterprise performance; (3) the capability to identify emerging risk factors and predict the probable future performance of an enterprise; and (4) the capability to provide early identification of incipient enterprise failure in order to maximize the opportunity for proactive preventative measures.

Figure 10:
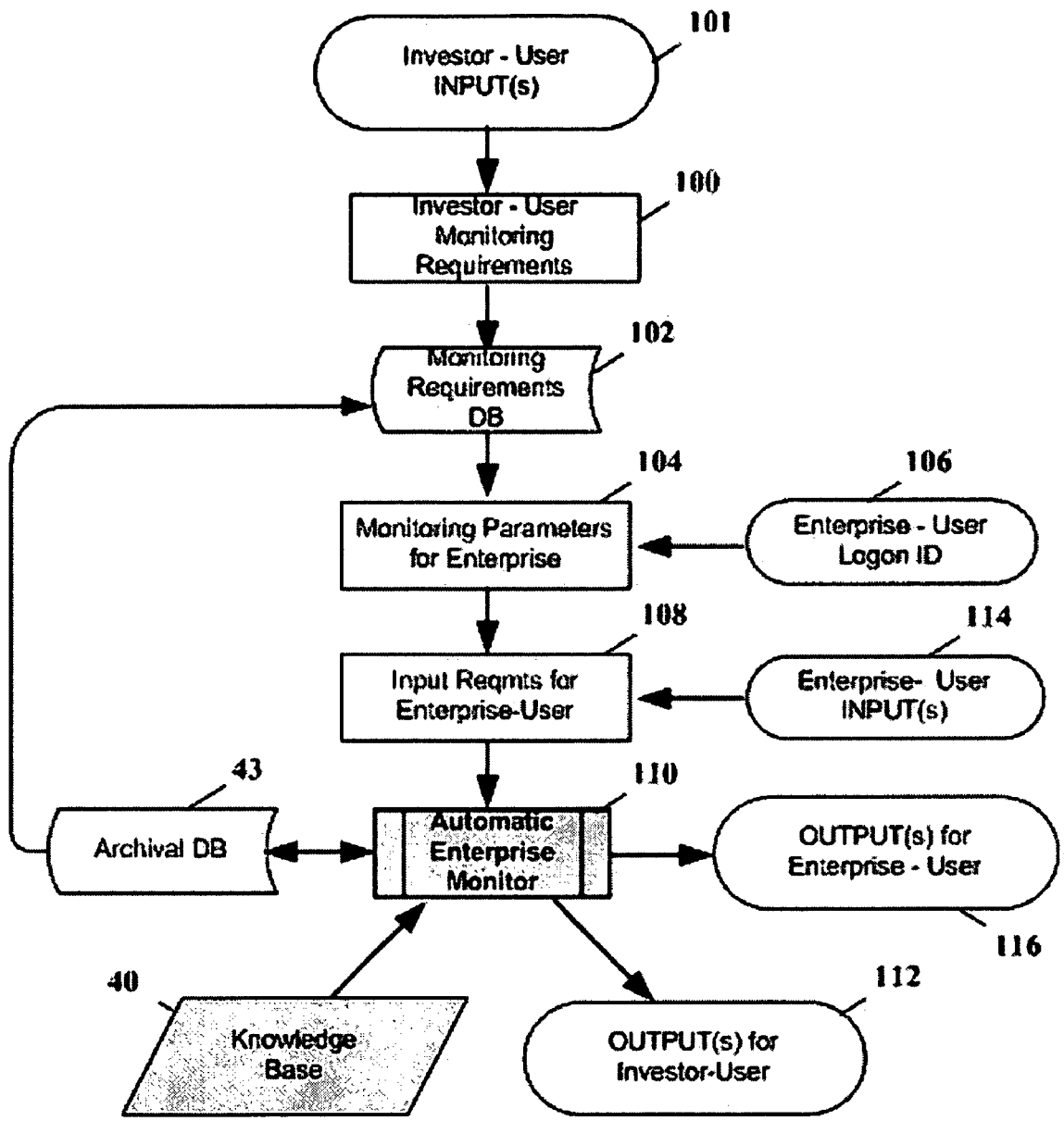
FIG. 10 is a diagram depicting logical elements of an enterprise monitoring system according to a preferred embodiment of the present invention.

Referring now to FIG. 10, the specific components of a monitoring system according to a preferred embodiment of the present invention may be described. Investor-user inputs block 101 is used to feed data to investor-user monitoring requirements block 100. When constructing a monitoring profile, investor-users are offered a wide range of enterprise monitoring metrics from which to choose. While investor-users have the capability to choose and monitor qualitative enterprise parameters, most monitoring metrics consist of quantifiable parameters that in aggregate contain sufficient information to adequately indicate to investor-users when additional investigation of enterprise progress is warranted. For each enterprise, the most informative and effective parameters of which to monitor depend on the type and maturity of the enterprise. While a universal core set of monitoring parameters may be utilized for a majority of enterprises, each enterprise cross-section based on enterprise type and maturity typically requires additional monitoring parameters specific to the unique maturation and risk factors of that enterprise cross-section.

Investor-users preferably have the capability to define and create enterprise monitoring profiles through one or a combination of a number of methods. In one approach, investor-users have the capability to choose a default template of enterprise monitoring parameters that contain a pre-existing set of parameters based on the specific type and maturity of enterprise. Investor-users also preferably have the capability to choose individual parameters from a list of possible monitoring parameters, the list consisting of those parameters contained in a default template. Additionally, investor-users may have the capability to choose individual parameters from a list of all possible monitoring parameters. Monitoring parameters may include independent enterprise parameters (IEP) obtained from enterprise-users, dependent values computed from IEPs (e.g., financial ratios), or values obtained from sources other than the reporting enterprise, such as independent service providers of economic and business intelligence or relevant subject-matter experts. Some monitoring parameters may include enterprise financial metrics that require considerable accounting resources on the part of enterprises and, therefore, limit the reasonable reporting frequency required of enterprise-users by investor-users (e.g., bimonthly vs. quarterly). Parameters by which enterprises may be monitored may include, but are not limited to, those contained in the following table, as well as those shown in the table presented above with respect to enterprise characterization block 12. The first column of the following table provides a monitoring parameter, and the second column identifies either the input source of that monitoring parameter or the input source of the information used to calculate that monitoring parameter. With respect to the second column, the following abbreviations are used:

ISP=independent service providers

SME=subject-matter expert

| CATEGORY A: FINANCIAL (historical) | |
| --- | --- |
| Total revenue | Enterprise-User |
| Component revenue for each product & service | |
| Growth rate in total revenue | |
| Growth rate in component revenue for each product & service | |
| Gross profit margin for each product & service | |
| Operating profit margin | |
| Net profit margin | |
| S&M, G&A, R&D (nominal value and as a % of revenue) | |
| Direct cash flow from operating, investing, and financing activities | |
| Capital expenditures | |
| Free cash flow or cash burn | |
| Inventory turnover | |
| Receivables turnover | |
| Payables turnover | |
| Working capital turnover | |
| Fixed asset turnover | |
| Total asset turnover | |
| Cash cycle turnover | |
| Operating cash turnover | |
| Quick ratio | |
| Cash flow from operations ratio | |
| Defensive interval | |
| Total cash liquidity | |
| Days to capital depletion (at time-weighted quarterly cash burn rate) | |
| Debt to total capital | |
| Debt to total assets | |
| Fixed charge coverage ratio | |
| Return on assets, total capital, and equity | |
| CATEGORY B: FINANCIAL (projected) | |
| Total revenue | Enterprise-User |
| Component revenue for each product & service | |
| Gross profit margin for each product & service | |

-continued

Cost of operations
Free cash flow or cash burn
Capital expenditures
Change in working capital
Backlog/sales pipeline

CATEGORY C: BUSINESS DEVELOPMENT

General development status                                                                 Enterprise-
Status of distribution network, supply chain, strategic partners, and                      User
government contracts
Number of customers or clients
Customer or client revenue concentration
Number of employees (by function & department)
Revenue per employee
Potentially valuable new services/products
Status of regulatory compliance
Changes to business or legal structure (restructuring, merger,
acquisition, joint venture, etc)
Changes to ownership structure (excluding internal equity compensation)

CATEGORY D: PRODUCT/SERVICE DEVELOPMENT

IP status (patents, trademarks, copyrights)                                                Enterprise-
Product performance status                                                                 User
Product unit cost status                                                                   SME
Timing of product/service release                                                          ISP
Capital efficiency of development
Technical barriers and limitations

CATEGORY E: MARKET DEVELOPMENT

Current estimate of market size, growth rate, and total penetration                        Enterprise-
rate for each market of each product and service                                           User
Current market share for each market of each product and service                           ISP
Status of barriers to market development
Status of drivers of market development
Status of any evolving standards
Potential new market opportunities

CATEGORY F: MANAGEMENT

Management effectiveness                                                                   Enterprise-
Management turnover                                                                        User
Relative management compensation
Projected employee headcount (by function)

CATEGORY G: COMPETITION

Development status of competing products and services                                      Enterprise-
IP status of competition                                                                   User
Change in relative aggregate capitalization of competition                                 SME
Status of emerging, potentially disruptive technologies                                    ISP

CATEGORY H: EXOGENOUS ENVIRONMENT

Leading economic index                                                                     ISP
Interest rates                                                                             Internal
Equity capital availability

CATEGORY I: OTHER

Probability of failure (computed by monitoring system)                                     Enterprise-
Specific risk factors identified by enterprise analyzer or during due                      User
diligence                                                                                  Internal
Change in accounting method(s)
Notable legal changes or events Certain of the monitoring parameters identified above are explained in more detail below:

Category A: Financial (Historical)
  1. Days to Capital Depletion=(365/4)*(Cash+Marketable Securities/Time-Weighted Cash Burn Rate for four most-recent quarters)

Category C: Business Development
  1. General Development Status—The status of business development compared to projected milestones in the original business plan.
  2. Status of Distribution Network, Supply-Chain, Strategic Partners, and Government Contracts—Status of efforts to establish or expand distribution network, advancement and management of enterprise supply chain, number and context of strategic partners, and status of current and future potential government research and development cost-sharing contracts.
  3. Customer Revenue Concentration—Portion of revenue from each of the top five customers or clients.

Category D: Product/Service Development
  1. IP Status—Status of applied and granted, US and international patents, and status of trademarks and copyrights.
  2. Product Performance Status—For each product, comparison of current performance level(s) to those projected in the original business plan.

3. Product Unit Cost Status—For each product, comparison of current unit production cost to the original business plan unit production cost curve for an evaluation of relative progress towards cost-effecting technology advancements, production process improvements, and volume production efficiencies.
4. Timing of Product/Service Release—Comparison of current timeline for product/service release to that of original business plan and prior monitoring update.
5. Capital Efficiency of Development—A long-term measure of the efficiency and effectiveness by which capital is employed for technology development, which is quantified in terms of monetary value.
6. Technical Barriers and Limitations—Disclosure of any technical barriers to further product advancement and any limitations of product applicability.

Category E: Market Development
1. Status of Barriers to Market Development—Status of barriers to market development identified during screening or due diligence process. Could include necessary advancements in enabling ancillary technologies and limitations in market adoption rate.
2. Status of Drivers of Market Development—Status of drivers of market development identified during screening or due diligence process. Developments or events that may stimulate market demand, such as government legislation, regulatory changes, and advances in enabling ancillary technologies.
3. Status of Any Evolving Standards—Status of any technological and regulatory standards that are evolving in a relevant industry, especially with regard to competing standards and the likelihood of market prevalence and resulting barrier to the enterprise standard.
4. Potential New Market Opportunities—Notable new markets for product(s) or service(s) of the enterprise that were previously unidentified.

Category F: Management
1. Management Effectiveness—A quantitative metric that characterizes the effectiveness of management in terms of capital management and business, technology, and market development.
2. Management Turnover—Any changes in key management personnel.
3. Relative Management Compensation—A measure that quantifies aggregate management compensation relative to various indications of enterprise performance. This ratio is compared to the mean of the peer group in order to assess the relative performance-based compensation level of management.

Category G: Competition
1. Development Status of Competing Products/Services—Current development status of competing products/services in terms of unit cost and performance characteristics.
2. IP Status of Competition—Intellectual property position of competing enterprises and any potential resulting infringement by enterprise or competing company.
3. Change in Relative Aggregate Capitalization of Competition—Current and expected new capitalization of competing enterprises that may engender excessive product or service supply relative to projected target market size.
4. Status of Emerging, Potentially Disruptive Technologies—Obtained via relevant subject-matter experts, the current development, commercialization, or otherwise generation maturation status of potentially market-disruptive, competing technologies. Also, the probable timing of future milestones in terms of performance, limitations, cost, and market introduction.

Category H: Exogenous Environment
1. Leading Economic Index—Provided by the Economic Cycle Research Institute, a quantitative, high-frequency leading index of U.S. economic growth.
2. Interest Rates—Measures of the cost of debt capital for various durations.
3. Equity Capital Availability—A proprietary metric that quantifies the relative availability of equity capital.

Category I: Other
1. Probability of Failure—(Enterprise probability of failure will be described more fully below with respect to predict failure block 124 of FIG. 11.)
2. Specific Risk Identified by Enterprise Analyzer or During Due Diligence—Risk factors specifically identified for the unique enterprise by the system of the preferred embodiment or during the due diligence process.

For each parameter of an enterprise monitoring profile, investor-users have the capability to establish, and periodically alter, reference limit values that are automatically compared to IEP, dependent values computed from IEP, or values obtained from sources other than the reporting enterprise. The reference limit values serve as triggering events for automatic notification of investor-users, as will be described in greater detail below. These reference limit values include, but are not limited to, benchmark deviation limits and thresholds limits. The benchmark deviation limit may be defined as a certain value of standard deviation or error about a reference benchmark value that may be selected such that if the actual value exceeds the value of standard deviation or error above or below the reference benchmark value, a triggering event occurs. For example, if actual enterprise revenue exceeds a predetermined degree of deviation from a pro-forma operational revenue projection, a triggering event occurs. The threshold limit may be defined as a certain single or multiple reference threshold value(s) that may be selected such that if an actual value exceeds a reference threshold upper or lower limit, a triggering event occurs. Investor-users have the capability to utilize one of several methods for the establishment of reference limit values (i.e., triggering events) for each chosen monitoring parameter.

In establishing benchmark and threshold reference limit values for comparison to actual future enterprise performance or exogenous factors (e.g., interest rates), investor-users have the capability to enter values at investor-user terminal 4 or employ information contained in archival database 43 as the basis for benchmark and threshold values, as will be described in more detail below. For example, pro-forma financial projections originated by the enterprise can be employed as the basis for reference benchmark and threshold values by investor-users. Additionally, investor-users have the capability to establish reference limit values through selection of a relevant default template that contains standard deviation or error and threshold reference values for each monitoring parameter and that are based on the type and maturity of the enterprise in question.

Investor-users have the capability to customize functional aspects and output content of the monitoring system. The results of the automated functions (described below for blocks 122, 124, and 126 in reference to FIG. 11) may be included or excluded in investor-user output 112. If the function of predict performance via risk-model 2 block 126 is selected for inclusion in investor-user output 112, investor-users have the capability to select, from an available list, enterprise operational metrics for which the prediction of future performance will be computed and featured in investor-user output 112. Investor-users also have the capability to select, from an available list, any enterprise or peer group related parameters that, as a result, are illustrated in graphical form in investor-user output 112. For specific monitoring parameters that exhibit preliminary indications of abnormal deviation that are not confirmed by multiple data points (i.e., reporting periods), investor-users preferably have the capability to place that parameter in a watch list that signifies the parameter as requiring particular attention by the investor-user in subsequent reporting periods.

Monitoring requirements database 102 is a database component that is used to store the investor-user reference information and functional customization settings described above with respect to the discussion of monitoring requirements block 100. For each enterprise monitoring parameter, this information may include, but is not limited to: reference benchmark, reference benchmark standard deviation or error limit(s), and reference upper and lower threshold limit(s). Information sets (i.e., monitoring profiles) contained in monitoring requirements database 102 are associated with specific investor-users and respective enterprises and enable the function described below with respect to monitoring parameters for enterprise block 104 and characterize limit intersections block 120 of FIG. 11. Based on the unique logon identification of each enterprise-user at block 106, the specific monitoring profile for the associated enterprise is retrieved from monitoring requirements database 102 at monitoring parameters for enterprise block 104.

For each defined monitoring parameter of a unique enterprise monitoring profile that requires IEPs, corresponding IEPs are solicited from associated enterprise-users through input requirements for enterprise-user block 108. As described above, some monitoring parameters are computed from and dependent on one or more IEPs solicited from enterprise-users. The processing of input requirements for enterprise-user block 108 thus solicits from enterprise-user input block 114 the set of IEPs that provide the information necessary to satisfy, or to compute from the IEPs, the parameters of the monitoring profile from monitoring requirements database 102. Automatic enterprise monitor block 110 is used to perform various monitoring calculations, as will be described in detail below. In order to enable the functions of automatic enterprise monitor block 110, additional IEPs that are necessary for those computations may also be solicited of enterprise-users at input requirements for enterprise-users block 108.

As already explained, archival database 43 contains enterprise-related endogenous and exogenous, empirical and longitudinal information that includes but is not limited to original enterprise attributes, time series enterprise performance parameters, and exogenous parameters. This information may be utilized by investor-users in establishing reference comparison values at investor-user monitoring requirements block 100. To populate archival database 43 with enterprise-related longitudinal performance information, IEPs that are submitted through input requirements for enterprise-user block 108 may be stored in archival database 43. Information complied or computed as part of the functioning of automatic enterprise monitor block 110 may also be stored in archival database 43 for reference and access by various components of the system. A feedback mechanism allows parametric enterprise reference information contained in archival database 43 to be accessed by monitoring requirements database 102 for use in processing related to investor-user monitoring requirements block 100.

Figure 11:
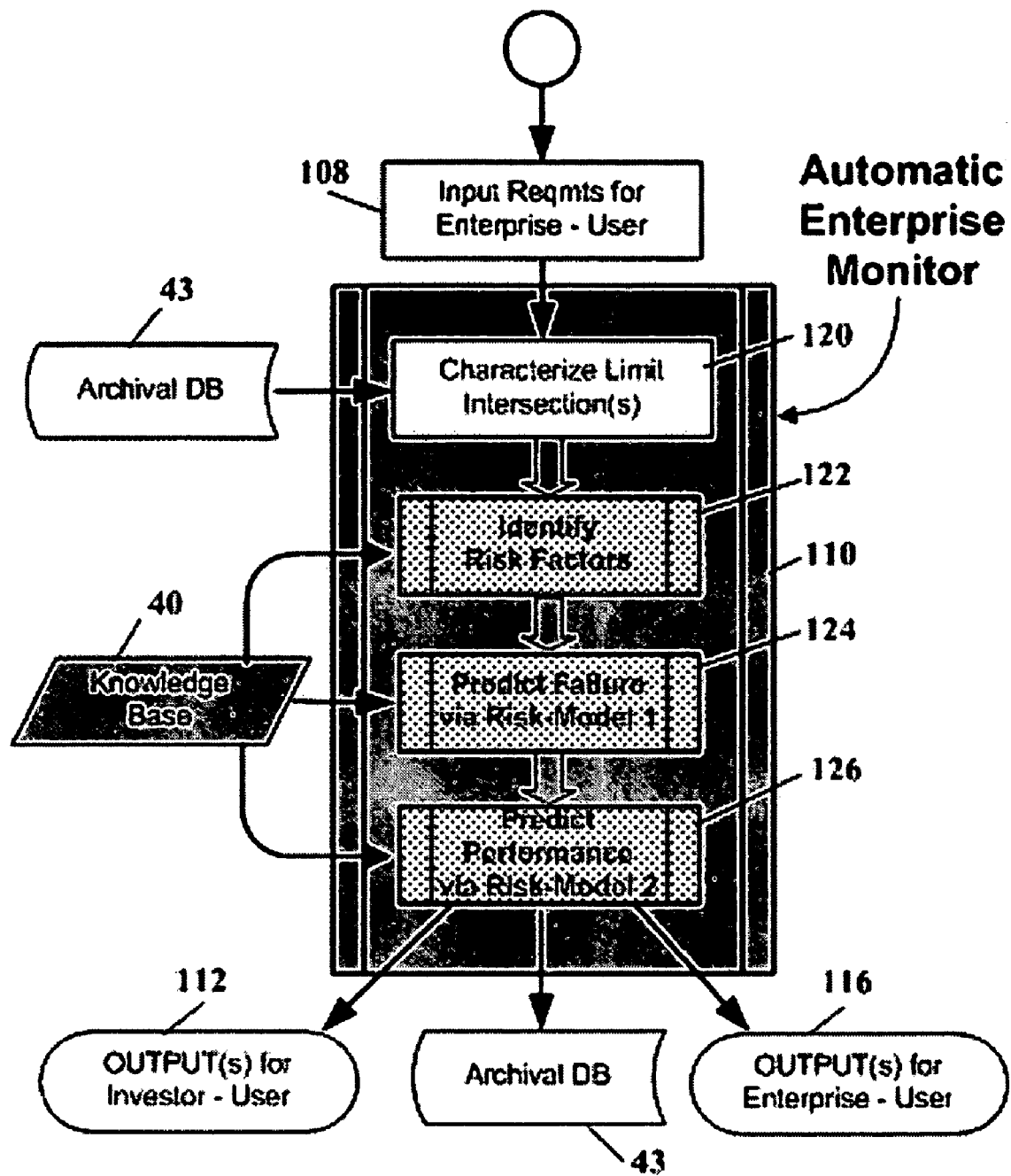
FIG. 11 is a diagram depicting logical elements of the automatic enterprise monitor component of the enterprise monitoring system according to a preferred embodiment of the present invention.

Referring now to FIG. 11, the processing of automatic enterprise monitor block 110 may be described in greater detail. Input requirements for enterprise-user block 108 feeds the required information (as described above) from the enterprise-user into automatic enterprise monitor block 110. Automatic enterprise monitor block 110 is comprised of characterize limit intersections block 120, identify risk factors block 122, predict failure via risk model #1 block 124, and predict performance via risk model #2 block 126.

For each monitoring parameter in which a reference limit value is intersected by the actual value, characterize limit intersections block 120 functions to identify the monitoring parameter and determine certain other information. For intersections of benchmark deviation or error limit values, characterize limit intersections block 120 functions to find the associated limit value and degree of deviation or error relative to the reference benchmark and limit value. For intersections of threshold limit values, characterize limit intersections block 120 functions to find the associated limit value and degree of deviation beyond the limit value (i.e., the upper or lower limit value). Characterize limit intersections block 120 also may obtain from archival database 43 all historical limit value intersections involving monitoring parameters including, but not limited to, the date of the intersection, and the historical limit values (of whichever type is relevant), along with the associated degree of deviation or error with respect to each value.

Turning now to identify risk factors block 122, its function is to utilize the operations as described with reference to FIGS. 6-8 above to compute the probability distribution and mean value of future enterprise failure that is associated with each enterprise attribute which is statistically correlated with peer enterprise failure. In addition to utilization of the type of reference correlations described above, it preferably incorporates potential peer reference correlations between the independent events described in reference to characterize limit intersections block 120 and dependent dichotomous enterprise failure, which are contained in knowledge base 40. Utilizing the calculations described in reference to FIGS. 6-8 and according to the product of the mean risk value and associated weighting factor R(x), it then ranks in descending order all enterprise-specific attributes (i.e., parameters) that are determined to be correlated with failure. It illustrates with each ranked enterprise parameter the probability distribution and mean value of future enterprise failure that is associated with each enterprise parameter.

With reference now to predict failure via risk model #1 block 124, its function is to compute the statistical probability of future enterprise failure through utilization of the operations for risk model #1 as described with reference to FIGS. 5-8 above. Risk model #1 incorporates enterprise attributes as the independent variable in reference correlations contained in knowledge base 40. In addition to utilization of these types of reference correlations, risk model #1 uses potential peer reference correlations between the independent events assessed at characterize limit intersections block 120 and dependent dichotomous enterprise failure, which is also contained in knowledge base 40.

Predict performance via risk model #2 block 126 functions to predict the risk-adjusted future value(s) of any actual enterprise operational metric (e.g., revenue and free cash flows) by computing the statistical probability of deviation of that value from the corresponding risk-unadjusted projected value of the operational metric through utilization of the operations for risk model #2 as described with reference to FIGS. 5-8 above. Risk model #2 incorporates enterprise attributes as the independent variable in reference correlations contained in knowledge base 40. In addition to utilization of these types of reference correlations, it incorporates potential peer reference correlations between the independent events assessed at characterize limit intersections block 120 and the dependent deviation as described above, which is also contained in knowledge base 40. Alternatively, predict performance via risk model #2 block 126 may predict the risk-adjusted future value of any actual enterprise operational metric through a non-linear adjustment of the extrapolation of that metric from its current trend by a peer correlation that relates the current (i.e., to-date) periodic trend in deviation to the future periodic trend in deviation of actual operational value(s) from projected operational value(s). In this process, it utilizes correlations based on a peer group that associate the current periodic trend in deviation of actual operational values from projected operational values with the future periodic trend in deviation of the actual operational values from projected operational values. In addition to storing IEP information obtained at input requirements for enterprise-user block 108, archival database block 43 may store information generated at automatic enterprise monitor block 110.

Output for investor-user block 112 provides for the delivery of an output report that characterizes the maturation progress of the enterprise and contains the information selected by investor-users at investor-user monitoring requirements block 100. This report may include, but is not limited to, a summary of the information content generated by characterize limit intersections block 120 for each reference limit intersection; a ranking of enterprise specific risk factors (parameters), each of which features an associated illustration of the probability distribution and mean value of future enterprise failure that is associated with that factor; an illustration that features both the mean value and probability distribution of enterprise failure; for each operational metric selected by the investor-user for prediction of performance as calculated at predict performance via risk model #2 block 126, a graphic illustration of the continuous trend in that metric for both historical and future time periods; a graphic illustration of primary pro-forma enterprise operational projections and the deviation of actual values from those projections; a graphic illustration of any enterprise or peer group related parameters that are pre-selected for inclusion in investor-user output at investor-user monitoring requirements block 100; the details of any monitoring parameters contained in a parameter watch list; a parameter history that features detailed information regarding specific parameters, especially qualitative parameters with limited or no potential for quantitative analysis; and the details of any user notes previously created.

Output for enterprise-users block 116 provides for the delivery of an output report that characterizes the maturation progress of the enterprise. This report may include, but is not limited to, a graphic illustration of primary pro-forma enterprise operational projections and the deviation of actual values from those projections; the identification of specific reference limit intersections or near intersections (in order to create awareness by enterprise-users of operational constraints and targets expected by associated investor-users); and the identification and ranking of enterprise-specific risk factors (parameters).

Figure 12:
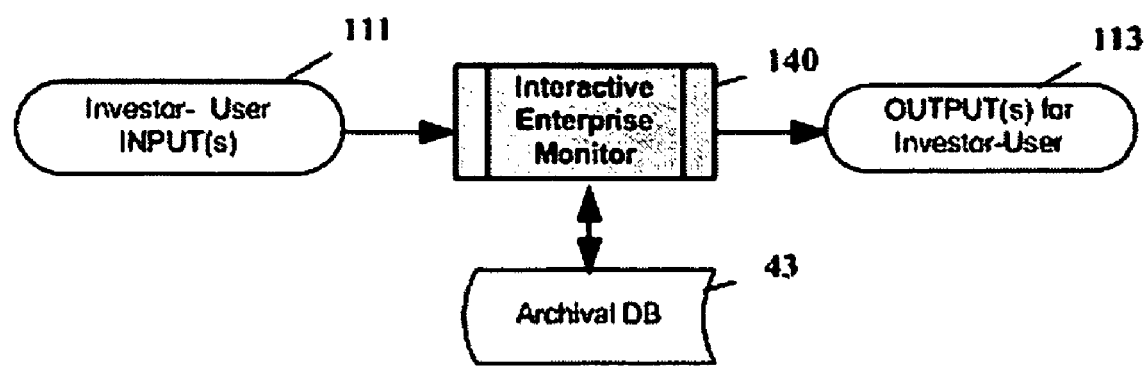
FIG. 12 is a diagram depicting the interactive enterprise monitor component of the enterprise monitoring system according to a preferred embodiment of the present invention.
Figure 13:
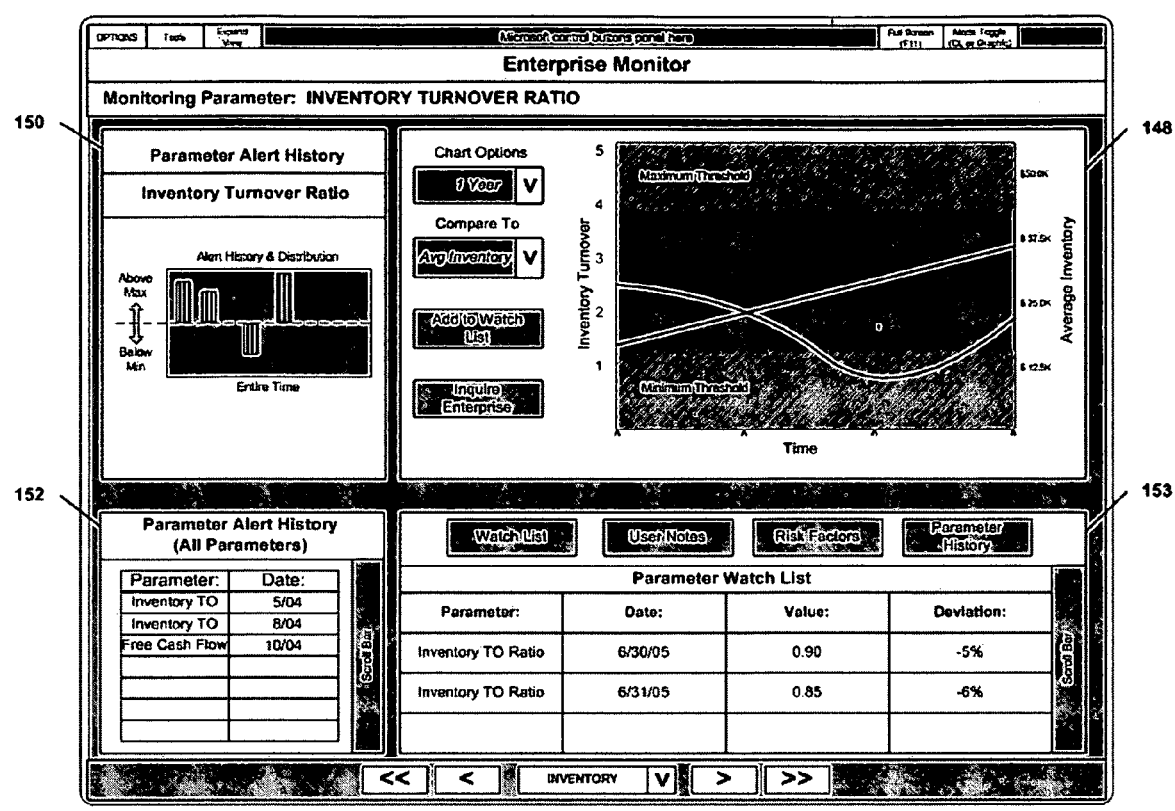
FIG. 13 is an illustration of an exemplary user screen displayed by the interactive enterprise monitor system when an inventory turnover ratio parameter is selected according to a preferred embodiment of the present invention.
Figure 14:
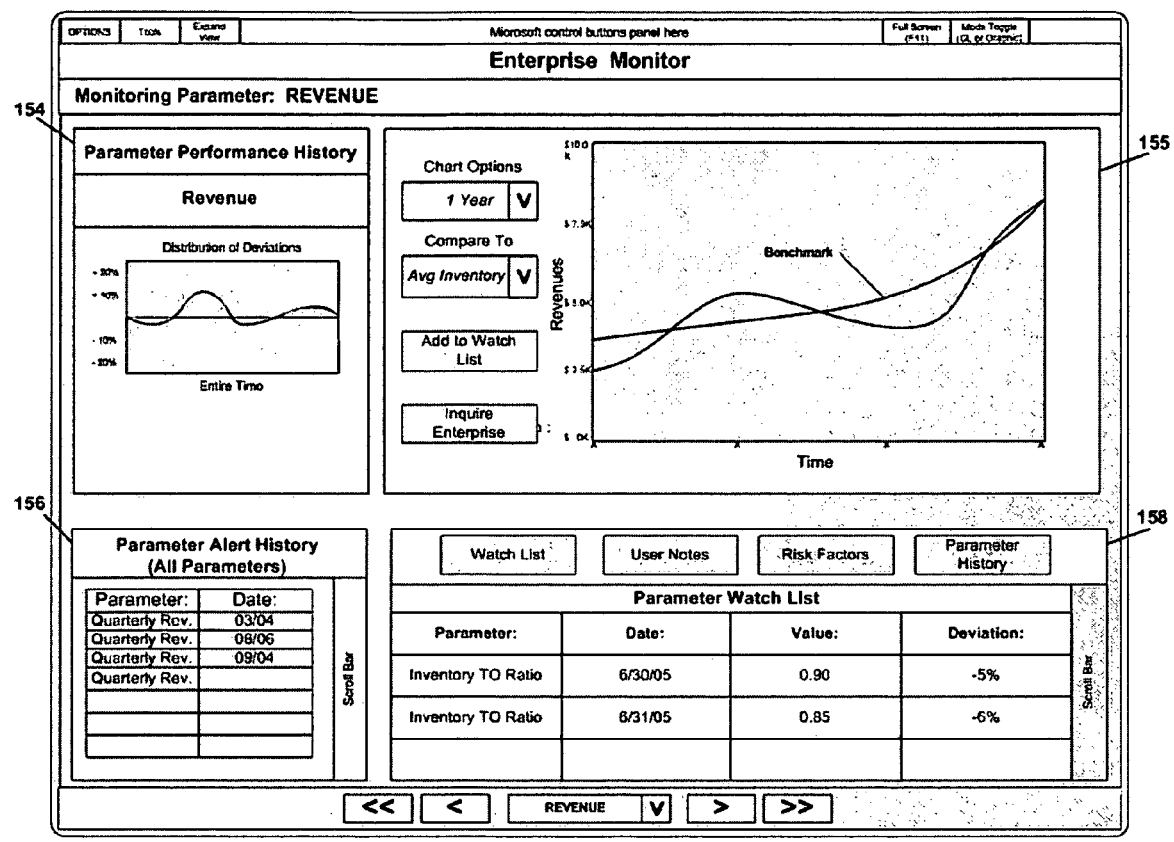
FIG. 14 is an illustration of an exemplary user screen displayed by the interactive enterprise monitor system when a revenue parameter is selected according to a preferred embodiment of the present invention.

The monitoring system of a preferred embodiment of the present invention comprises an interactive component, as illustrated in FIG. 12. This system component is integrated with archival database 43, thereby providing investor-user access to all information generated by block 108 and 110. This component enables investor-users to interactively access and analyze information contained in archival database 43 through interactive graphical displays generated at interactive enterprise monitor block 140. Examples of such displays are illustrated in FIGS. 13 and 14 as inventory turnover ratio graphical display 148 and revenue graphical display 155, respectively. Investor-users have the capability to select, for graphic illustration and for a specified term, a series of values for any parameter(s) within, but not limited to, the following categories of parameters: historic and projected operational metrics for a specific enterprise, including prior operational projections that have changed; benchmark deviation and threshold limit reference values established by the investor-users at investor-user monitoring requirements block 100; historic and projected parameters that are exogenous to the enterprise (e.g., economic indicators); historic and projected parameters computed at predict failure via risk model #1 block 124 or predict performance via risk model #2 block 126; and historic and projected operational metrics for any or all enterprise peer group(s) in the form of median or mean values. Investor-users have the capability to graphically display any of the parameters described in the form of a single parameter or multiple parameters displayed simultaneously. The display can preferably be configured to illustrate only values for a specified time period. For any parameter in which an investor-user wants to signify as requiring particular attention in subsequent reporting periods, the investor-user preferably has the capability to place the displayed parameter in a parameter watch list. In addition, if an investor-user wishes to inquire concerning a specific enterprise attribute, the investor-user may utilize the internal communication system to send an inquiring communication to the relevant enterprise-user.

For the parameter that is selected for display on the primary dependent axis of the primary graphical display 148 or 155, a history of the parameter's deviations for either benchmark or threshold limits may be generated. The time period of this graphic is dependent on and consistent with the time period selected for the primary display graphic. Such a parameter display is shown by the examples of parameter alert history 150 of FIG. 13 and parameter performance history 154 of FIG. 14. For all parameters that have intersected a benchmark or threshold limit, the history of these intersections may preferably be featured in a scrollable list that is organized in descending order according to the date of intersection. For example, such a history is shown at parameter alert history (all parameters) 152 of FIG. 13 and parameter alert history (all parameters) 156 of FIG. 14.

The monitoring display as illustrated by the examples of FIGS. 13 and 14 may also include a multifunctional content reference component, which is illustrated by multifunction sections 153 and 158 of those figures, respectively. The multifunction section of each graphical display provides access to various forms of enterprise monitoring information described as follows. The watch list, when selected, features all monitoring parameters that have been previously added by the investor-user to the parameter watch list. For each parameter contained in the watch list, the following information may be provided: the name of the parameter; the date on which the parameter was added to the watch list; the value of the parameter at the time that it was added to the watch list; the value of the benchmark or threshold deviation or error at the time of the parameter's addition to the watch list. The user notes component, when selected, features previously entered user notes and allows users to enter new content notes. Notes may be categorized by association with a specific parameter or characterized as general in context. Also preferably included in the multifunction section, as illustrated by multifunction sections 153 and 158, is a risk factors feature which, when selected, lists the enterprise risk factors as identified in identify risk factors block 122 of FIG. 11. The risk factors are preferably ranked in descending order with the associated probability distribution and mean value of future enterprise failure illustrated with each ranked enterprise parameter. Finally, the multifunction section may contain a parameter history feature which, when selected, provides detailed information regarding specific parameters, especially with regard to qualitative parameters that have limited or no potential for quantitative analysis.

Figure 15:
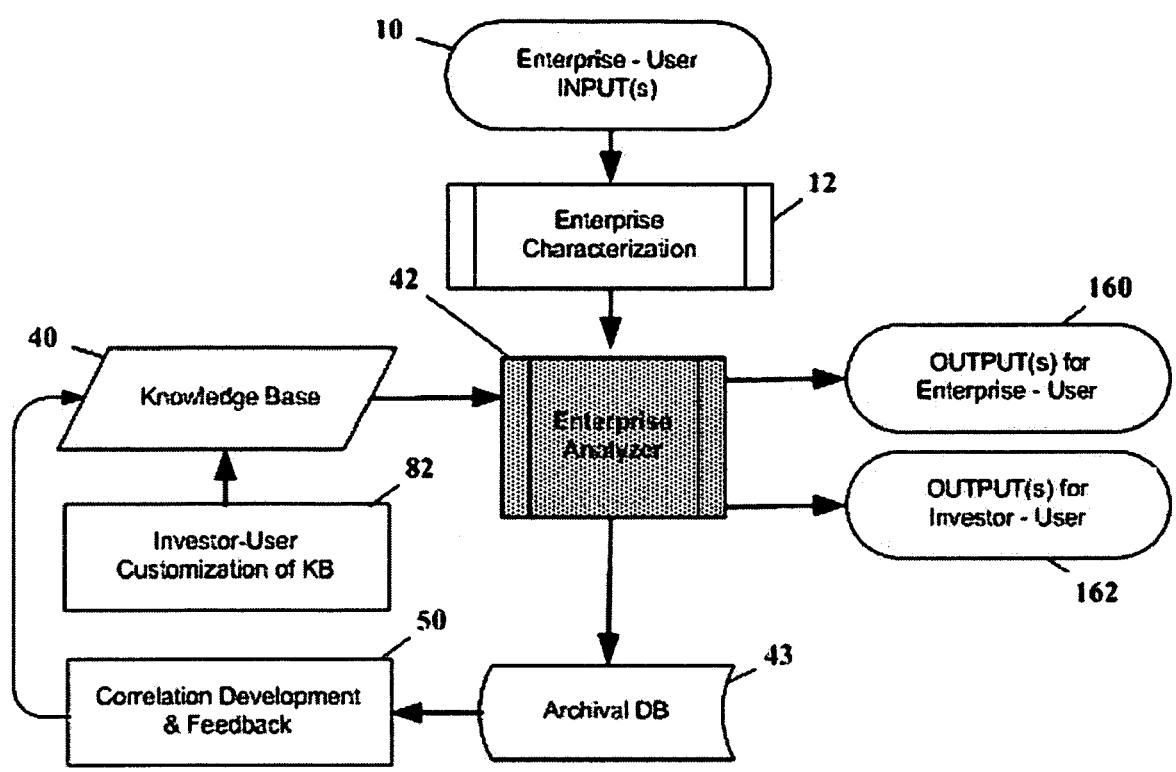
FIG. 15 is a diagram depicting logical elements of an enterprise analysis system according to an alternative embodiment of the present invention.

Referring now to FIG. 15, enterprise analyzer block 42 and associated blocks are presented according to an alternative embodiment of the present invention. In this alternative embodiment, enterprise analyzer block 42 and associated blocks function together as an individual system and utilize the same processes previously described for blocks 10, 12, 40, 42, 43, 50 and 82. With regard to block 160, it provides the capability to inform enterprise-users of any planning or information inadequacies related to the enterprise in order to qualify the degree of information adequacy for comprehensive enterprise characterization at block 12. In the alternative embodiment, much of the information generated at investor-user output block 162 is graphical in form. Investor-user output block 162 includes the capability for the investor-user to receive for each unique enterprise a summarized analysis that includes quantitative and qualitative information that characterizes the specific enterprise investment opportunity. Such information may preferably include a probabilistic quantification of the enterprise RA-IRR through a probability density profile chart that illustrates the computed RA-IRR as a function of corresponding probability for each of the range of possible RA-IRR values. Such information may also include an RA-IRR probability density profile for the median or mean of relevant peer enterprises; a probabilistic quantification of the enterprise risk profile through a radar illustration for each of the risk categories quantified by the method; and a categorized risk profile for the median or mean of relevant peer enterprises.

Figure 16:
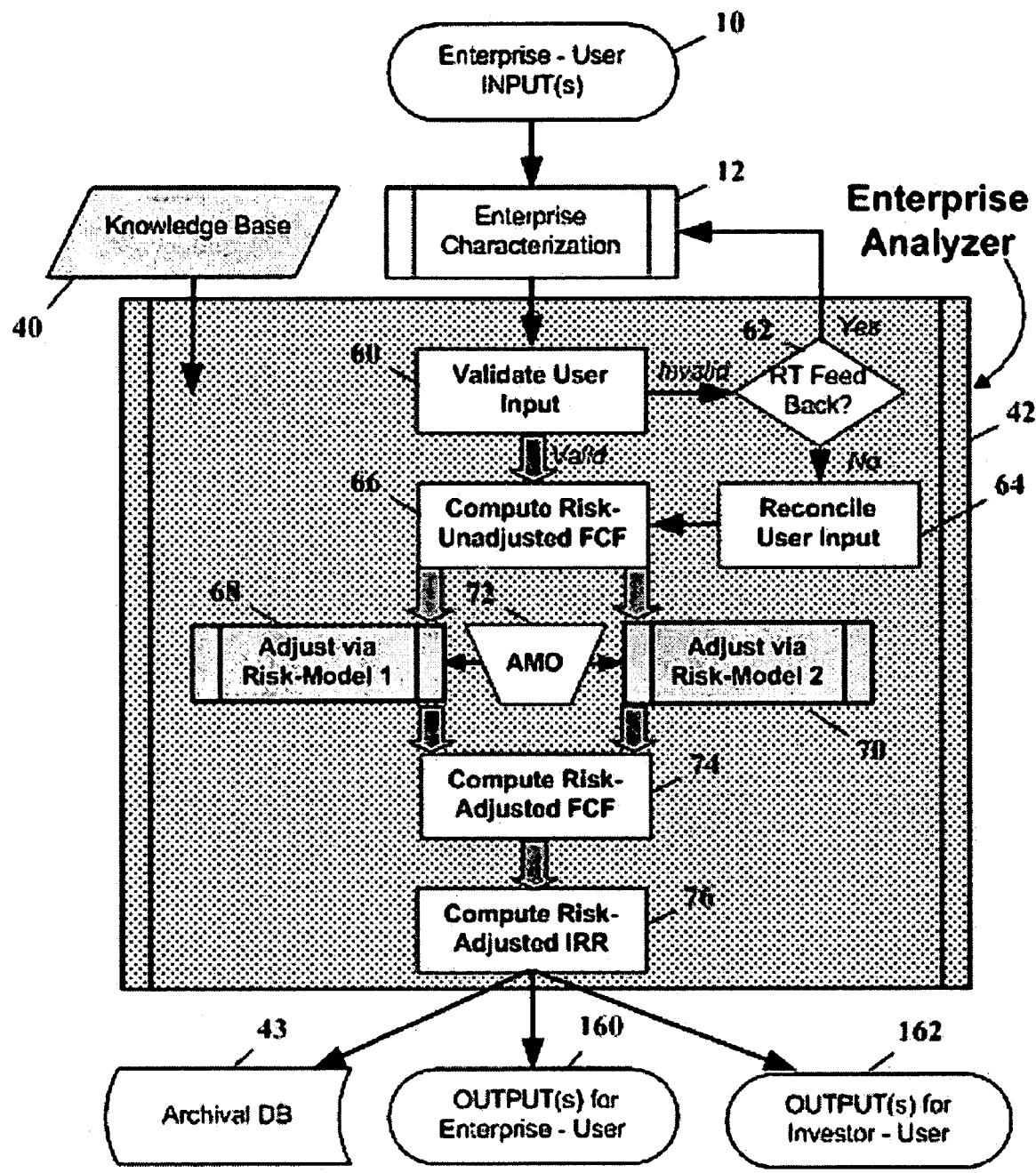
FIG. 16 is a diagram further depicting logical elements of an enterprise analysis system according to an alternative embodiment of the present invention.

Referring now to FIG. 16, enterprise analyzer block 42 is further presented according to an alternative embodiment of the present invention. In this alternative embodiment, enterprise analyzer block 42 and associated sub-system blocks function as previously described.

Figure 17:
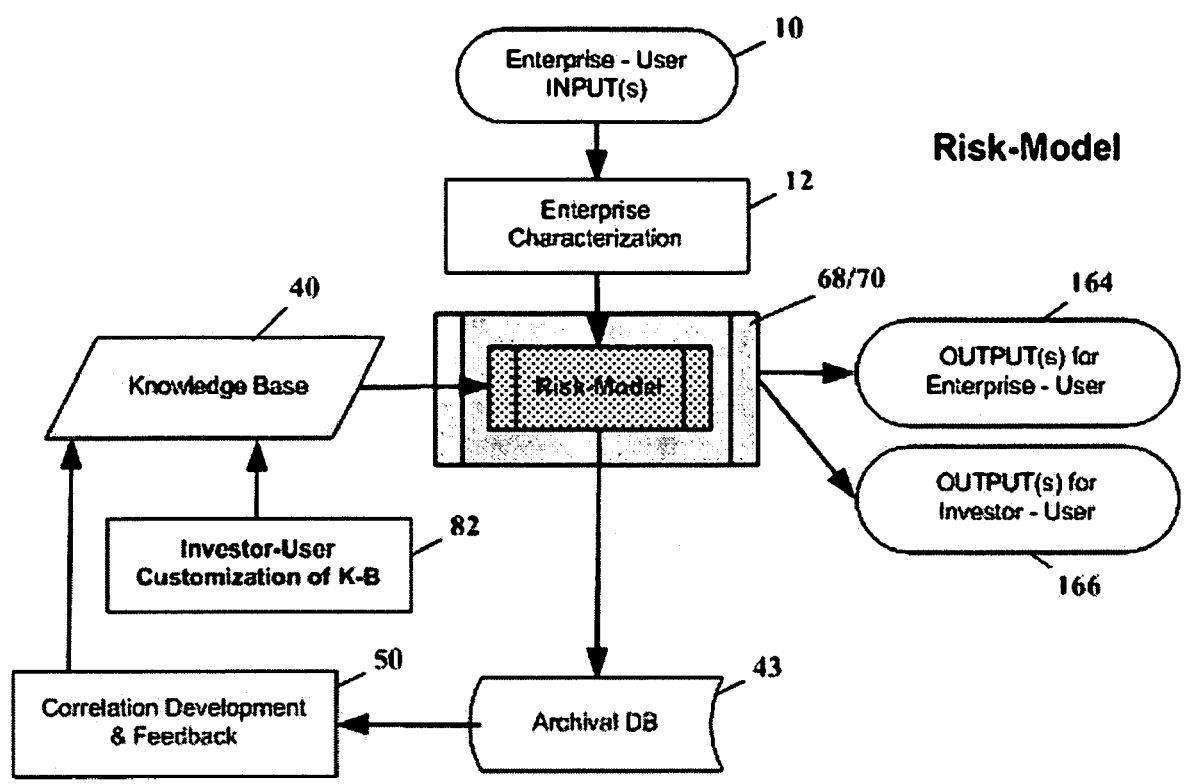
FIG. 17 is a diagram depicting logical elements of an enterprise risk model system according to an alternative embodiment of the present invention.

Referring now to FIG. 17, risk model block 68/70 and associated blocks are presented according to an alternative embodiment of the present invention. In this alternative embodiment, risk model block 68/70 and associated blocks function together as an individual system and utilize the same processes previously described for blocks 10, 12, 40, 68, 70, 43, 50 and 82. As in the preferred embodiment, the investor-user has the capability to select the specific risk model (i.e., block 68 or 70) that is employed for the computation of enterprise risk. With regard to block 164, it provides the capability to inform enterprise-users of any planning or information inadequacies related to the enterprise in order to qualify the degree of information adequacy for comprehensive enterprise characterization at block 12. In the alternative embodiment, much of the information generated at investor-user output block 166 is graphical in form. Investor-user output block 166 includes the capability for the investor-user to receive for each unique enterprise a summarized analysis that includes quantitative and qualitative information that characterizes the risk of the specific enterprise. Such information may preferably include a quantification of enterprise risk represented by a mean value (i.e., risk value) and probability distribution (i.e., risk distribution) of risk. Such information may also include a probabilistic quantification of the enterprise risk profile through a radar illustration for each of the risk categories quantified by the method and a categorized risk profile for the median or mean of relevant peer enterprises.

The present invention has been described with reference to certain preferred and alternative embodiments that are intended to be exemplary only and not limiting to the full scope of the present invention as set forth in the appended claims.

The invention claimed is:

1. A computer system for matching enterprise agents with investor agents, comprising:
   (a) an enterprise characterization module resident on a server system comprising at least one server configured to obtain information concerning an enterprise characterization from an enterprise agent resident on an enterprise-user terminal, wherein said server system and enterprise-user terminal are connected through a computer network;
   (b) an investor requirements module resident on said server system and configured to obtain information concerning investor requirements from an investor agent resident on an investor-user terminal, wherein said server system and investor-user terminal are connected through the computer network; and
   (c) an analysis module resident on said server system configured to receive information from said enterprise characterization module and said investor requirements module, generate an investor output comprising enterprises matching the investor requirements information, wherein said enterprises are drawn from a set of enterprises each of which are seeking at least one of investment monies or a liquidity event, and generate a multi-factor enterprise scoring value associated with each enterprise seeking at least one of investment monies or a liquidity event, wherein said investor-user terminal is configured to receive said investor output and said multi-factor enterprise scoring value from said server system through said network and display said investor output and said multi-factor enterprise scoring value.

2. The system of claim 1, wherein said enterprise characterization module is configured to request certain information concerning an enterprise that is determined by and based originally upon a characterizing categorization of the enterprise.

3. The system of claim 1, wherein said enterprise characterization module is configured to request information concerning an enterprise dynamically, wherein a subsequent query is based upon a response to a previous query.

4. The system of claim 1, wherein said enterprise characterization module is configurable by the enterprise agent to conditionally block access to at least some of the enterprise information by the investor agent in said analysis module.

5. The system of claim 1, wherein said enterprise characterization module further comprises an enterprise valuation calculator configured to generate an offering valuation for the enterprise.

6. The system of claim 5, wherein said enterprise valuation calculator is configurable to obtain from an enterprise agent, the value of premium or discount relative to peer-based enterprise risk-adjusted internal rate of return that is desired by an enterprise agent.

7. The system of claim 6, wherein said enterprise valuation calculator computes an offering valuation for the enterprise based on a reconciliation of said value of premium or discount relative to peer-based enterprise risk-adjusted internal rate of return and one or more of future risk-adjusted free cash flows and residual incomes.

8. The system of claim 1, wherein said enterprise characterization module is further configurable by the enterprise agent to store incomplete information for fulfillment of information at a later time.

9. The system of claim 1, wherein said analysis module is further configured to generate output comprising one of feedback to the enterprise agent concerning the quality and adequacy of data input to said enterprise characterization module.

10. The system of claim 1, wherein said analysis module is further configured to generate output comprising one of feedback to the enterprise agent concerning the number of investors who possess an enterprise investment focus that matches the character of the enterprise.

11. The system of claim 1, wherein said analysis module is further configured to generate output comprising one of feedback to the enterprise agent concerning the number of investors that have viewed information concerning the enterprise.

12. The system of claim 1, wherein said investor requirements module is configured to obtain information concerning desired enterprise attributes and associated limit constraints for a desired enterprise to be used in enterprise matching by said analysis module.

13. The system of claim 1, wherein said investor requirements module is configured to obtain information concerning one or more of a desired risk-adjusted internal rate of return and desired risk value for a desired enterprise to be used in enterprise matching by said analysis module.

14. The system of claim 1, wherein said investor requirements module is configured to obtain information concerning a desired type of multi-factor enterprise scoring value by which enterprises in said investor output of said analysis module are sorted.

15. The system of claim 1, wherein said investor requirements module is configured to obtain information concerning one of desired automation of said investor output of said analysis module such that enterprise matches are automatically communicated to investor agent.

16. The system of claim 1, wherein said investor requirements module is configured to obtain information concerning one of a set of desired weighting parameters to be used in a calculations by a risk model of said analysis module.

17. The system of claim 1, wherein said investor requirements module is configured to obtain information concerning one of a desired valuation modeling method to be used by said analysis module.

18. The system of claim 1, wherein said investor requirements module is configured to obtain information concerning one of a desired risk model to be used by said analysis module.

19. The system of claim 1, wherein said investor requirements module is configured to obtain information concerning one of a set of desired adjustments to default knowledge base reference correlations to be used by said analysis module.

20. The system of claim 1, wherein said investor requirements module is configured to obtain information concerning one of desired enterprise-related attributes to be displayed with each associated enterprise in said investor output of said analysis module.

21. The system of claim 1, wherein said analysis module is further configured to sort enterprise matches in said investor output by said multi-factor enterprise scoring value.

22. The system of claim 1, further comprising an archival database module resident on said server system configured to store and access one or more of empirical and longitudinal information comprising one or more of original enterprise-related characteristics, post-funding enterprise-related performance characteristics, investor agent enterprise searching characteristics, investor agent system customization characteristics, and investor agent investment decision characteristics.

23. The system of claim 1, further comprising a knowledge base module resident on said server system configured to store and access statistical reference correlation information to be used by said analysis module.

24. The system of claim 1, wherein said analysis module comprises:
  (a) an enterprise analyzer module;
  (b) a search module configured to search for matches between investor agent search inputs from said investor requirements module and enterprise agent inputs from said enterprise characterization module;
  (c) a sort module configured to sort matches from said search module according to said multi-factor enterprise scoring value.

25. The system of claim 24, further comprising a correlation development and feedback module resident on said server system configured to identify in an archival database resident on said server system, statistical correlations to be stored in a knowledge base resident on said server system and used by said enterprise analyzer module.

26. The system of claim 24, wherein said enterprise analyzer module comprises a user input validation module configured to validate and invalidate information from said enterprise characterization module.

27. The system of claim 26, wherein said user input validation module is configured to validate and invalidate said information by comparing interrelated said information for consistency in a predetermined mathematical relationship.

28. The system of claim 26, wherein said user input validation module is resident on said server system and configured to validate and invalidate said information by verifying inclusion of said information in a range of reference values of one or more of a predetermined standard error and statistical significance about one or more of the median and mean value of relevant reference parameter(s).

29. The system of claim 26, wherein said user input validation module is configured to request for at least some invalidated information, valid input from the enterprise agent at an enterprise characterization module.

30. The system of claim 24, wherein said enterprise analyzer module comprises a user input reconciliation module configured to reconcile and adjust invalid information from said enterprise characterization module.

31. The system of claim 30, wherein said user input reconciliation module is configured to reconcile said invalid information by adjustment of said invalid information to a value that achieves the precision inherent to a relevant predetermined mathematical relationship.

32. The system of claim 30, wherein said user input reconciliation module is configured to reconcile said invalid information by adjustment of said invalid information to a value consisting of the nearest boundary of a range of values of one or more of a predetermined standard error and statistical significance about one or more of the median and mean value of at least one relevant reference parameter.

33. The system of claim 24, wherein said enterprise analyzer module comprises a compute risk-unadjusted free cash flow module configured to compute one or more of future enterprise risk-unadjusted free cash flows and economic residual incomes.

34. The system of claim 33, wherein said compute risk-unadjusted free cash flow module is further configured to utilize validated and reconciled information to compute into perpetuity, one or more of enterprise risk-unadjusted free cash flows and economic residual incomes.

35. The system of claim 24, wherein said enterprise analyzer module comprises a risk model module configured to compute the risk of an enterprise.

36. The system of claim 35, wherein said risk model module is further configured to compute a probability of enterprise failure.

37. The system of claim 35, wherein said risk model module is further configured to compute an aggregation of systematic and unsystematic enterprise risk inherent to one or more of future free cash flows and economic residual incomes.

38. The system of claim 35, wherein said risk model module is configured to compute reference risk correlations between enterprise-related attributes and enterprise risk for characteristically similar cross-sections of an enterprise domain.

39. The system of claim 38, wherein said enterprise risk is empirically comprised of one or more of dichotomous enterprise success and failure and the degree of deviation of actual enterprise performance from projected performance.

40. The system of claim 35, wherein said risk model module is configured to identify based on the characteristic classification of the enterprise, relevant reference risk correlations within a knowledge base module.

41. The system of claim 40, wherein said risk model module is configured to compute using said relevant reference risk correlations, one or more of a mean value of risk and associated probability distribution of risk that is associated with each risk-correlated enterprise-related attribute.

42. The system of claim 41, wherein said risk model module is configured to aggregate one or more of said mean values of risk and associated probability distributions of risk into a risk value and risk distribution, respectively.

43. The system of claim 42, wherein said risk model module is configured to aggregate said mean values of risk and associated probability distributions of risk according to a certain weighting factor for each risk-correlated enterprise attribute, the said weighting factor of which is a function of the statistical significance of each enterprise attribute related reference risk correlation.

44. The system of claim 35, further comprising an interactive sensitivity analysis module resident on said server system configured to display graphically for investor agents, the net effect of incremental changes in investor requirements and re-calculation on said risk of one or more of a certain enterprise and enterprise peers.

45. The system of claim 24, wherein said enterprise analyzer module comprises a compute risk-adjusted free cash flow module configured to adjust one or more of future enterprise risk-unadjusted free cash flows and residual incomes by the risk of an enterprise.

46. The system of claim 45, wherein said compute risk-adjusted free cash flow module is further configured to compute one or more of probability-distributed and mean values of one or more of future enterprise risk-adjusted free cash flows and residual incomes by adjusting one or more of future enterprise risk-unadjusted free cash flows and residual incomes by a corresponding risk value and risk distribution of the enterprise.

47. The system of claim 24, wherein said enterprise analyzer module comprises a compute risk-adjusted internal rate of return module configured to compute one or more of a mean value and probability distribution of future risk-adjusted internal rate of return for an enterprise.

48. The system of claim 47, wherein said compute risk-adjusted internal rate of return module is further configured to compute a certain value that when used to discount one or more of probability-distributed and mean values of one or more of future enterprise risk-adjusted free cash flows and residual incomes, equates one or more of said probability-distributed and mean values with a current enterprise valuation provided by the enterprise agent.

49. The system of claim 1, wherein said analysis module is further configured to organize said enterprises by said multi-factor enterprise scoring value.

50. The system of claim 1, wherein said analysis module further comprises an enterprise search summary module generated in said investor output and configured to display and adjust said investor requirements by direct manipulation of a display.

51. The system of claim 1, wherein said analysis module is configured to include with each enterprise in said investor output, a summary that quantifies the number of investor agents who have accessed various levels of information for the enterprise.

52. The system of claim 1, further comprising an internal communication module resident on said server system configurable by an investor agent to request of an enterprise agent that blocked enterprise information in said investor output be authorized for view by investor agent in said investor output.

53. The system of claim 1, wherein said analysis module is configurable by an investor agent to designate any enterprises in said investor output with a certain rank relative to other enterprises in said investor output.

54. The system of claim 1, wherein said analysis module is configurable by an investor agent to remove any enterprises from inclusion in said investor output.

55. The system of claim 1, wherein said analysis module is configurable by an investor agent to indicate for view by other investor agents in said investor output, a note of interest in joining other investor agents in a certain enterprise investment.

56. The system of claim 1, wherein said analysis module is configurable by at least one of an investor agent and enterprise agent to remove an enterprise from inclusion in said investor output of other investor agents.

57. The system of claim 1, further comprising an enterprise monitoring module resident on said server system configured to receive information obtained by an investor monitoring requirements module and an enterprise input module, and generate an investor output comprising a monitoring analysis of enterprise performance.

58. The system of claim 1, wherein said analysis module generates said multi-factor enterprise scoring value based at least in part on enterprise ranking information input by said investor agents.

59. The system of claim 58, wherein said enterprise ranking information is stored in an archival database resident on said server system.

* * * * *